(12) United States Patent
Chow et al.

(10) Patent No.: US 8,418,091 B2
(45) Date of Patent: Apr. 9, 2013

(54) METHOD AND APPARATUS FOR CAMOUFLAGING A STANDARD CELL BASED INTEGRATED CIRCUIT

(75) Inventors: Lap Wai Chow, S. Pasadena, CA (US); James P. Baukus, Westlake Village, CA (US); Bryan J. Wang, South Lake Tahoe, CA (US); Ronald P. Cocchi, Seal Beach, CA (US)

(73) Assignee: SypherMedia International, Inc., Aliso Viejo, CA (US)

( * ) Notice: Subject to any disclaimer, the term of this patent is extended or adjusted under 35 U.S.C. 154(b) by 636 days.

(21) Appl. No.: 12/578,441

(22) Filed: Oct. 13, 2009

(65) Prior Publication Data

US 2010/0218158 A1 Aug. 26, 2010

Related U.S. Application Data

(63) Continuation-in-part of application No. 12/380,094, filed on Feb. 24, 2009, now Pat. No. 8,151,235.

(51) Int. Cl.
*G06F 17/50* (2006.01)

(52) U.S. Cl.
USPC ............................ 716/101; 716/104; 716/126

(58) Field of Classification Search .................. 716/101, 716/104, 126
See application file for complete search history.

(56) References Cited

U.S. PATENT DOCUMENTS

| | | | |
|---|---|---|---|
| 5,636,133 A | 6/1997 | Chesebro et al. | |
| 5,783,846 A | 7/1998 | Baukus et al. | |
| 5,866,933 A | 2/1999 | Baukus et al. | |
| 5,930,663 A | 7/1999 | Baukus et al. | |
| 5,973,375 A | 10/1999 | Baukus et al. | |
| 6,064,110 A | 5/2000 | Baukus et al. | |
| 6,117,762 A | 9/2000 | Baukus et al. | |
| 6,294,816 B1 | 9/2001 | Baukus et al. | |
| 6,305,000 B1 | 10/2001 | Phan et al. | |
| 6,351,172 B1 | 2/2002 | Ouyang et al. | |
| 6,459,629 B1 | 10/2002 | Clark, Jr. et al. | |
| 6,467,074 B1 | 10/2002 | Katsioulas et al. | |
| 6,613,661 B1 | 9/2003 | Baukus et al. | |
| 6,740,942 B2 | 5/2004 | Baukus et al. | |
| 6,748,579 B2 | 6/2004 | Dillon et al. | |
| 6,774,413 B2 | 8/2004 | Baukus et al. | |
| 6,791,191 B2 | 9/2004 | Chow et al. | |
| 6,815,816 B1 | 11/2004 | Clark, Jr. et al. | |
| 6,893,916 B2 | 5/2005 | Baukus et al. | |
| 6,897,535 B2 | 5/2005 | Chow et al. | |
| 6,919,600 B2 | 7/2005 | Baukus et al. | |
| 6,924,552 B2 | 8/2005 | Baukus et al. | |
| 6,940,764 B2 | 9/2005 | Clark, Jr. et al. | |
| 6,944,843 B2 | 9/2005 | Bansal | |
| 6,979,606 B2 | 12/2005 | Chow et al. | |
| 7,008,873 B2 | 3/2006 | Chow et al. | |
| 7,009,443 B2 | 3/2006 | Illegems | |
| 7,042,752 B2 | 5/2006 | Okuda | |
| 7,049,667 B2 | 5/2006 | Chow et al. | |
| 7,170,317 B2 | 1/2007 | White | |

(Continued)

*Primary Examiner* — Thuan Do
(74) *Attorney, Agent, or Firm* — Gates & Cooper LLP

(57) ABSTRACT

A method and apparatus for camouflaging an application specific integrated circuit (ASIC), wherein the ASIC comprises a plurality of interconnected functional logic is disclosed. The method adds functionally inert elements to the logical description or provides alternative definitions of standard logical cells to make it difficult for reverse engineering programs to be used to discover the circuit's function.

18 Claims, 30 Drawing Sheets
(12 of 30 Drawing Sheet(s) Filed in Color)

U.S. PATENT DOCUMENTS

| | | |
|---|---|---|
| 7,279,936 B2 | 10/2007 | Gliese et al. |
| 7,328,419 B2 | 2/2008 | Vuong et al. |
| 7,383,521 B2 | 6/2008 | Smith et al. |
| 7,733,121 B2 * | 6/2010 | Phoon et al. .................... 326/38 |
| 7,844,936 B2 | 11/2010 | Melzner |
| 7,895,548 B2 | 2/2011 | Lin et al. |
| 2002/0096744 A1 | 7/2002 | Chow et al. |
| 2002/0096776 A1 | 7/2002 | Chow et al. |
| 2004/0061186 A1 | 4/2004 | Chow et al. |
| 2004/0130349 A1 | 7/2004 | Morgenshtein et al. |
| 2004/0144998 A1 | 7/2004 | Chow et al. |
| 2005/0140389 A1 | 6/2005 | Gliese et al. |
| 2005/0161748 A1 | 7/2005 | Chow et al. |
| 2005/0230787 A1 | 10/2005 | Chow et al. |
| 2007/0261015 A1 | 11/2007 | Morgenshtein et al. |
| 2008/0237644 A1 | 10/2008 | Tripathi |
| 2008/0282208 A1 | 11/2008 | Anderson et al. |
| 2010/0218158 A1 | 8/2010 | Chow et al. |
| 2010/0231263 A1 | 9/2010 | Fish et al. |

* cited by examiner

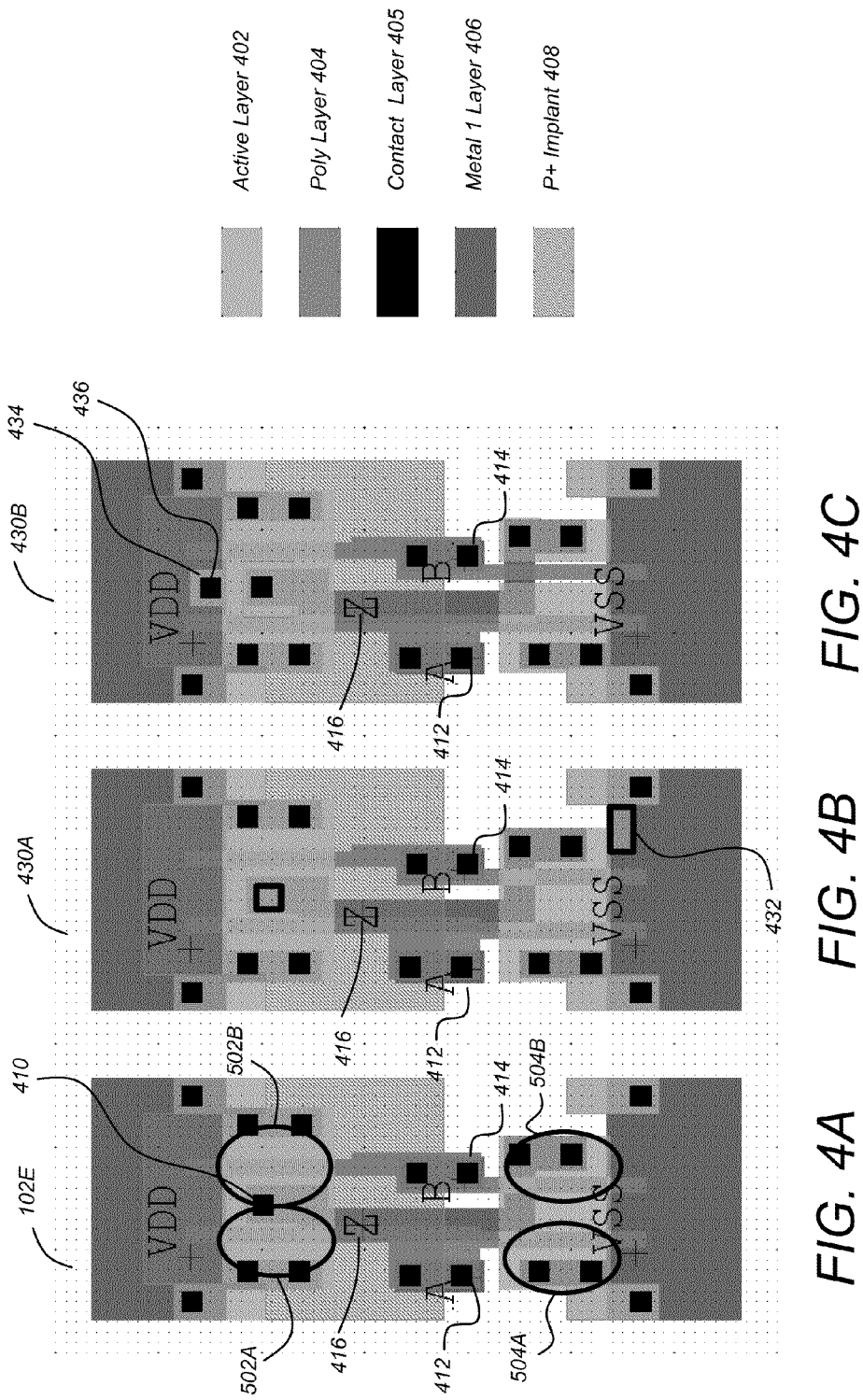

```
INPUT=L1INPUT1
OUTPUT=L2OUTPUT1
LOGIC 1 (L1INPUT1, L1OUTPUT1)
LOGIC 2 (L2INPUT1, L2OUTPUT1)
L1OUTPUT1=L2INPUT1
```
⎱ 2302

```
INPUT=L1INPUT1
OUTPUT=L2OUTPUT1
LOGIC 1 (L1INPUT1, L1OUTPUT1)
LOGIC 2 (L2INPUT1, L2OUTPUT1)
FILLER1(F1INPUT1, F2OUTPUT1)
L1OUTPUT1=L2INPUT1
FINPUT1=L1OUTPUT1=L2INPUT1
```
⎱ 2402

METHOD AND APPARATUS FOR CAMOUFLAGING A STANDARD CELL BASED INTEGRATED CIRCUIT

CROSS REFERENCE TO RELATED APPLICATIONS

This application is a continuation-in-part of U.S. patent application Ser. No. 12/380,094, filed Feb. 24, 2009 and entitled "METHOD AND APPARATUS FOR CAMOUFLAGING A PRINTED CIRCUIT BOARD," by Lap Wai Chow, James P. Baukus, Bryan J. Wang, and Ronald P. Cocchi, issued Apr. 3, 2012 as U.S. Pat. No. 8,151,235, which application is incorporated by reference herein.

BACKGROUND OF THE INVENTION

1. Field of the Invention

The present invention relates to systems and methods for protecting printed circuits from reverse engineering and in particular to a system and method for camouflaging a standard cell based integrated circuit.

2. Description of the Related Art

In today's standard-cell based application specific integrated circuit (ASIC) design, the logic function of the chip is modeled and simulated in higher-level hardware description languages (VHDL or VERILOG). It is then synthesized in a silicon compiler (e.g. SYNOPSIS) to generate a netlist using logic cells from a targeted standard-cell library. The netlist will be used in the backend physical design phase to perform the Place and Route of library cells, generating the full circuit layout of the ASIC for manufacturing. The Place and Route process uses an automated computer program placing all logic cells in appropriate locations, then connecting them with metal and via layers according to the connection information in the netlist. ASICs designed using this approach are vulnerable to reverse engineering (RE) attack. RE of an ASIC involves the steps of functional identification of logic cells and the extraction of the cells' connections. With the latest optical and scanning electron microscopic techniques, an ASIC's logic circuits and its wiring network can easily extracted by RE.

In a standard Place and Route process of an ASIC, some unused silicon areas with no logic cells will usually occur during cell placement due to the requirement of efficient routing. The presence of the unused silicon areas provides extra information, like the cell boundaries, to the reverse engineering process. RE usually starts the functional identification of logic cells near the unused silicon areas of the ASIC.

Existing techniques of filling higher metal and via layers to protect the ASIC from RE, described in U.S. Pat. No. 6,924,552, use an algorithm that make the filled layers of metals and vias look like real connectors. This filling technique is not applicable to layers like Metal 1, Contact, Poly and Active layers since these lower layers are not only used as connectors, but are also the basic building layers for P and N MOSFET devices in logic gates.

What is needed is an effective way to fill in the unused silicon spaces of Metal 1, Contact, Poly and Active implants to create a strong camouflage effect to protect the ASIC from reverse engineering.

Another drawback of the technique described in U.S. Pat. No. 6,924,552 is that most of the metals generated are not connected to any voltage source and thus are vulnerable to the voltage contrast' technique used in reverse engineering. What is also needed is a system and method for connecting a large number of metal wirings generated by the metal fill process in U.S. Pat. No. 6,924,552 to voltage sources.

The present invention satisfies the foregoing needs.

SUMMARY OF THE INVENTION

Application-specific integrated circuits (ASICs) built with standard-cell technology are vulnerable to piracy and fail to protect sensitive intellectual property by enabling reverse engineering of the design. The present invention ameliorates this problem by providing a computer-implemented method of camouflaging an ASIC for performing a logical function that comprises a plurality of interconnected functional logic. In one embodiment, the method comprising the steps of generating a logical description of the interconnected functional logic, the logical description comprising a plurality of interconnected logic cells, each logic cell including an input and an output, generating a logical description of a functionally inert camouflage element including a filler cell, generating a camouflaged logical description of the interconnected functional logic by incorporating the generated logical description of the functionally inert camouflage element into the generated logical description of the interconnected functional logic without affecting the logical function; and generating a camouflaged ASIC design from the camouflaged logical description. The foregoing method steps are performed on a user computer configured to support computer-aided design (CAD) of integrated circuits to generate etching and masking layer patterns. (for example, see: Physical Design Essentials—An ASIC Design Implementation Perspective by Golshan, Khosrow, Springer 2007, ISBN: 978-0-387-36642-5)

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout:

FIGS. 4A-5C are diagrams depicting how a filler cell physical layout design can be defined based on the physical layout design of a standard 2-input NAND gate from a typical standard cell library;

FIG. 27 is a drawing illustrating an example of the camouflaging technique described in

FIG. 26;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In standard-cell based ASIC design, the logic function of the chip is modeled and simulated in higher level hardware description languages such as "Very High Speed Integrated Circuit Hardware Description Language (VHDL) or VERILOG. It is then synthesized in a silicon compiler such as SYNOPSIS to generate a netlist using logic cells from a targeted standard-cell library. The netlist is then used in the backend physical design phase to locate the library cells on the ASIC and route connections between those library cells (known as a "Place and Route" or PR of the library cells), thereby generating the full circuit layout of the ASIC for manufacturing. The PR process uses an automated computer program placing all logic cells in appropriate locations then connects them with metal and via layers according to the connection information in the netlist.

ASICs designed using this approach are vulnerable to reverse engineering (RE) attack. Reverse engineering of an ASIC involves the steps of functional identification of logic cells and the extraction of the cells' connections. With the latest optical and scanning electron microscopic techniques, an ASIC's logic circuits and its wiring network can easily extracted by RE.

In a standard PR process of an ASIC, some unused silicon areas (gaps) with no logic cells will usually occur during cell placement due to the requirement of effective routing of circuit connections from one cell to another. The presence of the unused silicon areas provides extra information, like the cell boundaries, to the reverse engineering process. RE usually starts the functional identification of logic cells near the unused silicon areas of the ASIC.

Figure 1:
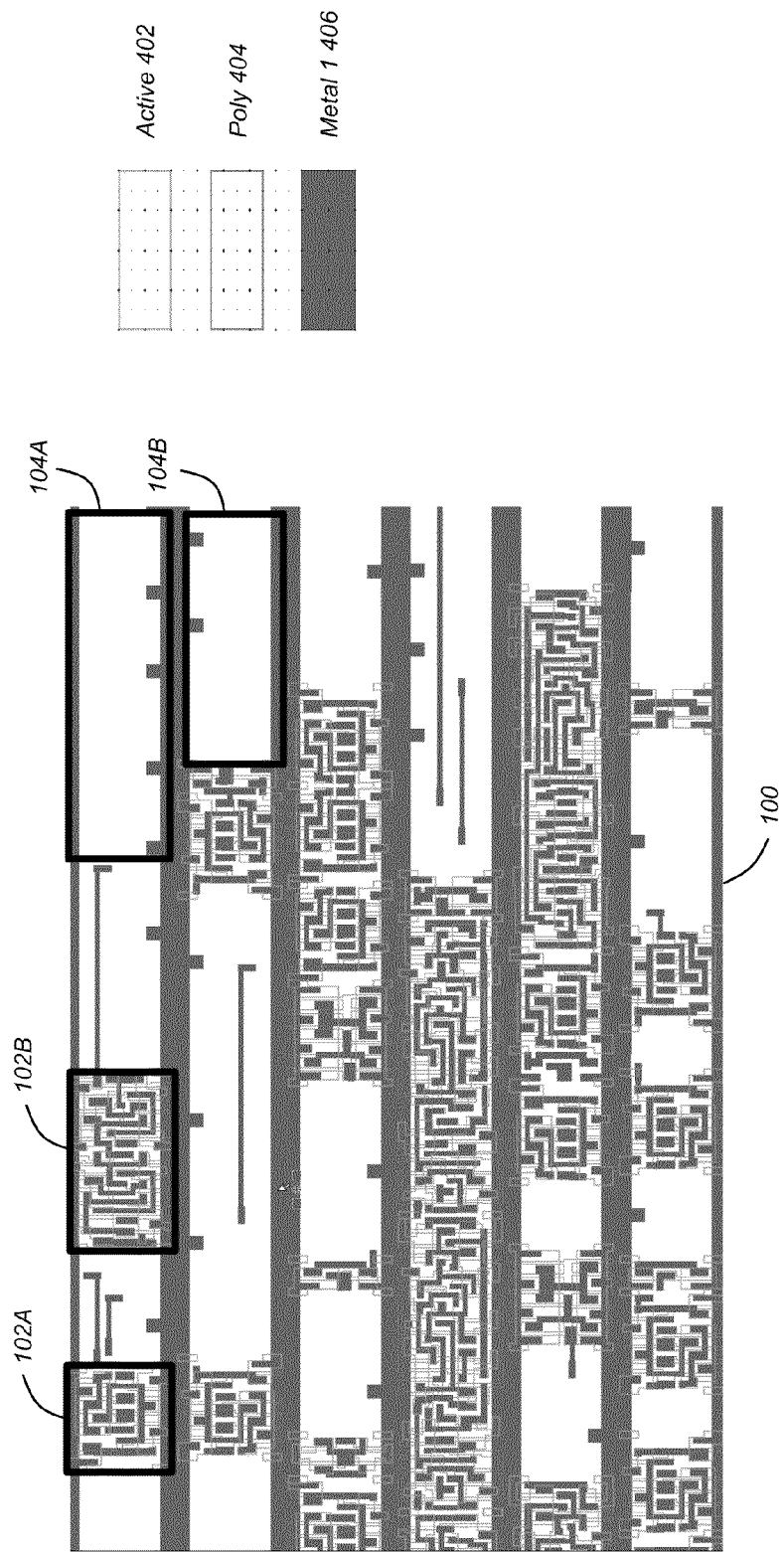
FIG. 1 is a diagram illustrating a portion of the ASIC design with unused silicon areas or gaps.

FIG. 1 is a diagram illustrating a portion of the ASIC design 100 with unused silicon areas or gaps 104A, 104B. A typical ASIC design includes an active layer, a poly layer, and a plurality of metal layers and vias to interconnect the layers. However, in the example shown in FIG. 1, only layers up to Metal 1 (active 402, poly 404, and metal 1 406) are depicted so that unused areas can be clearly shown.

Figure 2:
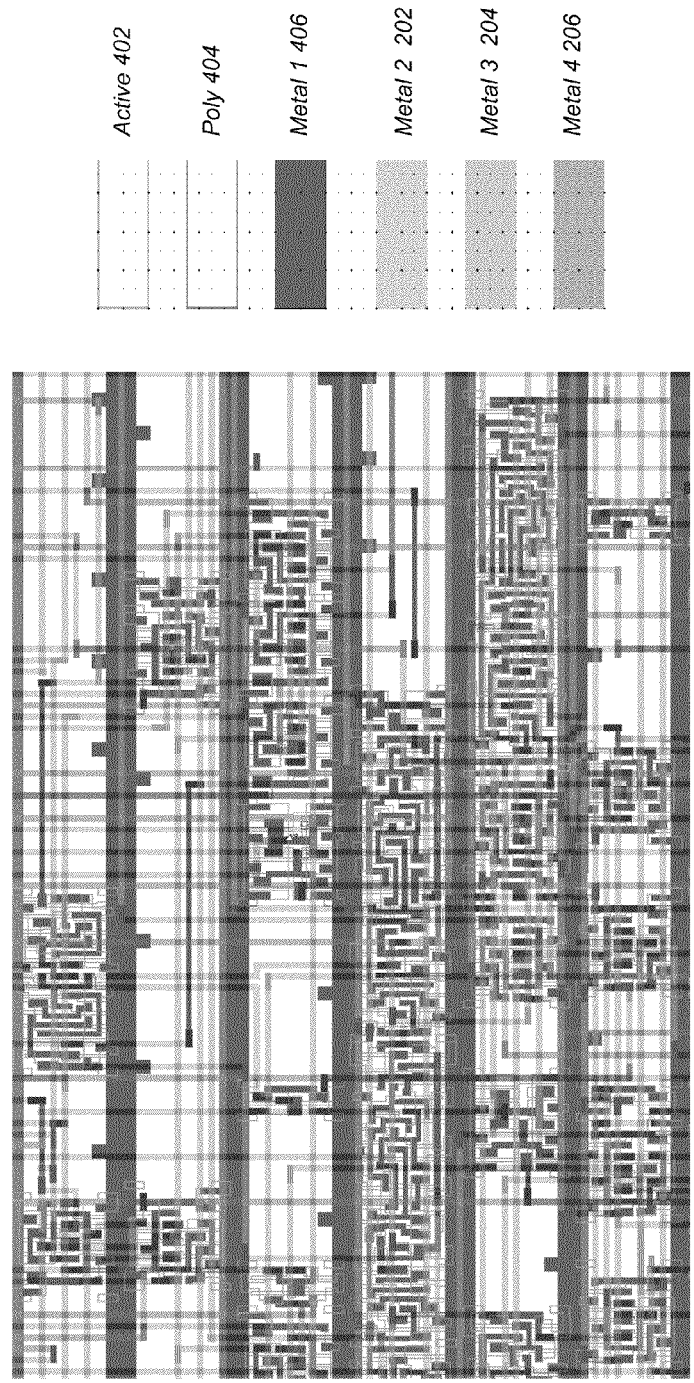
FIG. 2 is a diagram illustrating the same portion of the ASIC design as shown in FIG. 1, but also illustrating all the connecting metal layers.

FIG. 2 is a diagram illustrating the same portion of the ASIC design 100 as shown in FIG. 1, but also illustrating all the connecting metal layers.

Figure 3:
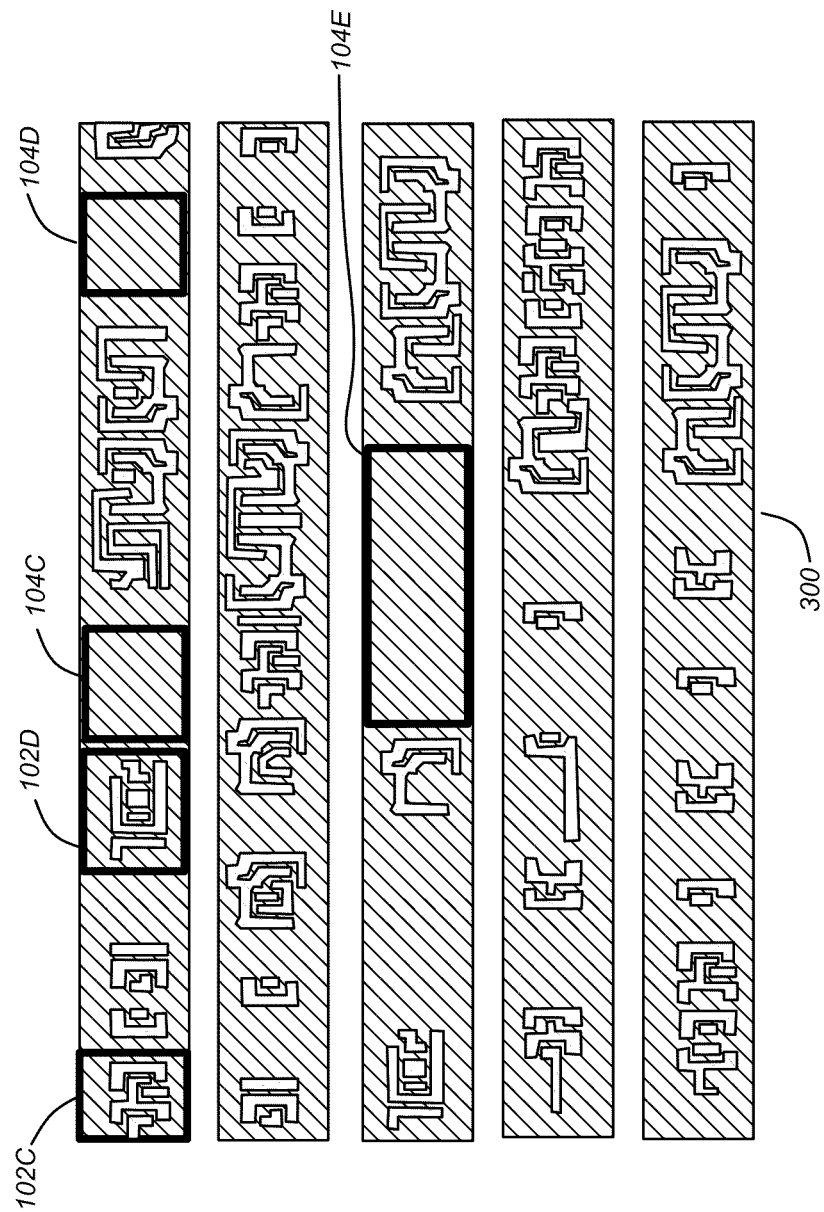
FIG. 3 is the scanning-electron-microscopic view of a portion of an actual ASIC after the removal of higher connecting metal layers, leaving only the first metal layer.

FIG. 3 is the scanning-electron-microscopic view of a portion of an actual ASIC 300 after the removal of higher connecting metals (Metal 2 and up), leaving only the first metal layer (Metal 1). Note that the ASIC 300 includes gaps 104C-104E, functional logic cells 102C, 102D interconnected by circuit traces in the Metal 1 layer. Filling the unused silicon areas with layers in Metal 1, Contact, Poly and Active implant provides a camouflage effect to the ASIC and make RE more difficult.

As described above, U.S. Pat. No. 6,924,552, which is hereby incorporated by reference herein, discloses the filling of higher metal and via layers to protect ASIC from RE, using an algorithm that make the filled layers of metals and vias appear like real connectors. However, this filling algorithm is not applicable to layers like Metal 1, Contact, Poly and Active implants and most of the metals generated are not connected to any voltage source and thus are vulnerable to the 'voltage contrast' technique used in reverse engineering.

A more effective way of filling in the unused silicon spaces with layers of Metal 1, Contact, Poly and Active implants to create a strong camouflage effect to protect the ASIC 100 from reverse engineering is described below. This method also includes a process to connect a large number of metal traces generated by the metal fill process in U.S. Pat. No. 6,924,552 to voltage sources.

U.S. Pat. Nos. 7,049,667, 6,815,816, 6,774,413, 6,924,522 attempt to protect ASICs from RE by making either the logic cell identification or the connection extraction difficult. In contrast, the technique described below uses unused areas in an ASIC to create a camouflage effect to increase the RE effort of an ASIC by a factor of ten or more. One aspect of the technique is the design of the standard cell like filler cells to fill all unused silicon areas in an ASIC.

A logic cell (e.g. a cell implementing a logical function such as "OR," "AND," "NOR," or "NAND") is selected from the standard cell library, and a filler cell is designed. Importantly, the filler cell is designed so that the physical design layout (the size, location, and material composition of the different layers of the filler cell) is substantially the same as the physical design layout for a functional logical cell, but different in that the physical design layout is modified so that the filler cell provides no logical function. For example, small changes in specific layers were made to alter the function of the filler cell to maintain a constant output at either '0' or '1' (equivalent to Vss or Vdd output) without regard to the input state.

FIGS. 4A-5C are diagrams depicting how a filler cell physical layout design can be defined based on the physical layout design of a standard 2-input NAND gate 102E from a typical standard cell library.

Figure 5A:
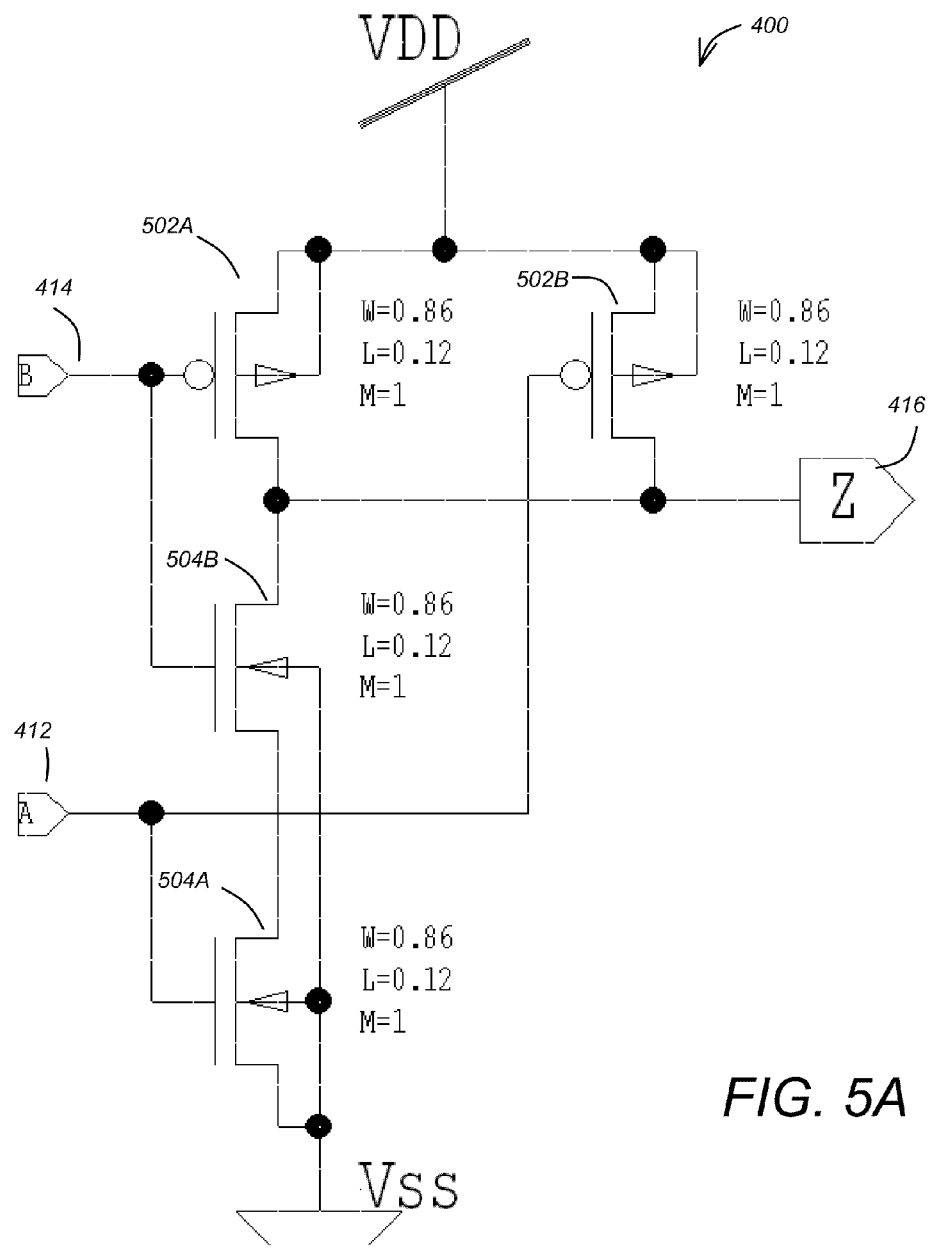

FIG. 4A is a diagram illustrating a physical design layout for a standard two-input NAND gate 102E, and FIG. 5A is a diagram illustrating a schematic diagram for the physical design layout shown in FIG. 4A.

A standard 2-input NAND gate 102E comprises two parallel connected P devices 502A, 502B connected between the output (Z) 416 and Vdd, and two series connected N devices 504A, 504B between the output (Z) and Vss, as shown in FIG. 5A.

Referring first to FIG. 4A, the physical design layout comprises a plurality of layers disposed over one another on a multilayer circuit board. The layers include an active layer 402, a poly layer 404, a contact layer 405, a first metal layer (Metal 1) 406 and a P+ implant (P-doped) layer 408. The P devices 502A, 502B are formed by the overlap of the Poly layer 404, P+ implanted layer 408 and active layer 402 shown in FIGS. 4A-4C while the N devices are formed by the overlap of Poly layer 404 on an N+ implanted active layer (the N+active layer is formed by an active layer with no coverage of P+ implant layer.

Figure 5B:
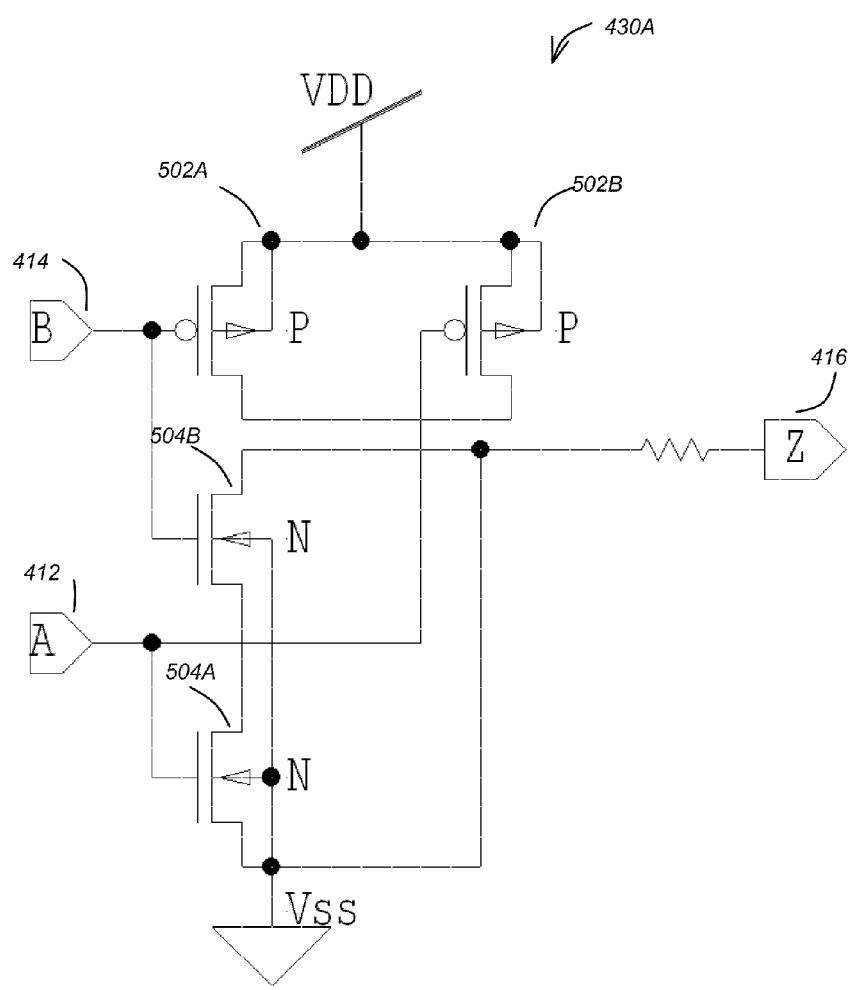

FIGS. 4B and 4C are diagrams depicting exemplary physical design layouts for two possible filler cells 430. FIG. 4B is a diagram depicting an exemplary physical design layout for a filler cell 430A in which the output is always a logical zero, while FIG. 5B is a schematic diagram of the exemplary filler cell 430A shown in FIG. 4B.

Note that the exemplary layer modifications of the 2-input NAND gate 400 shown in FIG. 4B result in an output of logical one while retaining substantially the same physical layout design. The modifications from the physical design layout of the standard cell 400 include layout changes in contact layer 405 and active layer 402 to make the output potential (Z) always equal to Vss (logical zero). The contact layer 405 refers to contacts connecting the Metal 1 layer to the doped Active (N or P doped) layers or the Poly layer. Specifically, in FIG. 4B, contact 410 is missing in the output connection to P-channel devices and an extra piece 432 of N+Active layer is added to short the output (Z) 416 to Vss (logical zero). The result is a non-functioning logic circuit with its output always at '0' or Vss.

Figure 5C:
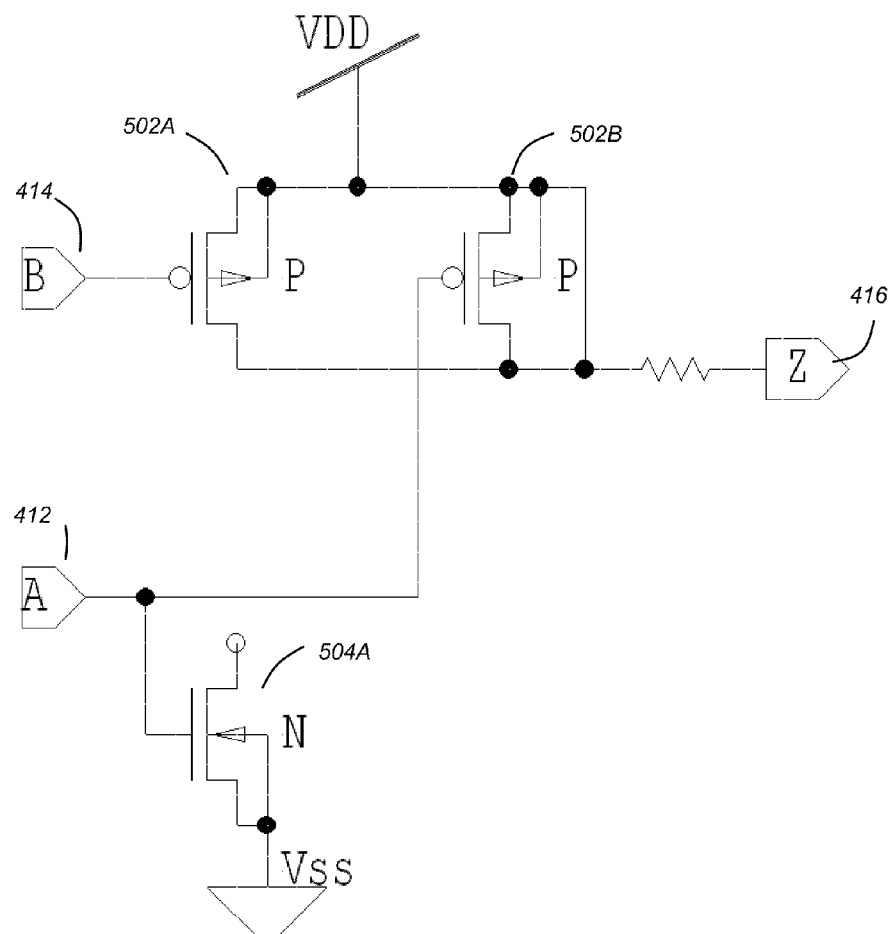

FIG. 4C is a diagram depicting an exemplary physical design layout for a filler cell 430B in which the output is always a logical one, and FIG. 5C is a schematic diagram of the exemplary filler cell 430B in which the output is always a logical one.

Note that the exemplary layer modifications of the 2-input NAND gate 400 shown in FIG. 4C result in an output (Z) 416 that is always equal to Vdd (logical one), while minimizing changes to the physical layout design, thus camouflaging the 2-input NAND gate 102E. Specifically, in FIG. 4C, the output (Z) 416 of filler cell 430 in FIG. 4C is shorted to Vdd through added contact 434 and the P+ Implant region 408. In order to have the output (Z) 416 not influenced by its inputs (A, B), the active layer 402 in FIG. 4C was also modified in the N+ Active region 434 making the output (Z) 416 isolated from the N devices. FIGS. 5A-5C are the schematics associated with the layout in FIGS. 4A-4C, respectively.

All filler cells 430 are designed to deliver a constant output of either logical zero or logical one, independent of the logical values at their inputs (inputs A 412 and B 414 in FIGS. 4A-4C and 5A-5C). These filler cells 430 perform no logic function but only serve as camouflage cells in the unused silicon areas 104. Hundreds of such filler cells 430 can be designed by modifying logic cells 102 from a standard cell library with minor variations in different circuit layers to accommodate the effect of having a constant output of either a logical one or a zero but no logical function.

FIGS. 4B and 4C present only examples of for purposes of illustration. While the filler cell 430 designs shown in FIGS. 4A and 4B may still be detectable using reverse engineering techniques, when taken in the aggregate with the other techniques described below, these filler cells 430 can be used to sufficiently camouflage the ASIC to make RE many times more difficult. Other camouflage techniques like those described in U.S. Pat. Nos. 7,049,667, 6,815,816, 6,774,413, 6,924,522 (which are hereby incorporated by reference) for hiding connections or isolations can be used to enhance the camouflage effect of these filler cells 430. Also, multiple variations of filler cells can be designed with reference to one library cell so to reduce the effect of a specific signature in certain layers of the filler cell design.

Since each filler cell 430 is designed according to a logic cell 102 in the library, the physical size of the designed filler cell 430 will be the same as the original reference logic cell 400. However, different newly designed filler cells 430 can have different sizes and thus be able to fill into different sized gaps 104. In ASIC design terminology, a routing track is a circuit trace that interconnects the logical cells 102. The size of a logic cell 102 and the gaps 104 or empty silicon space between logic cells 102 are typically counted in terms of the number of routing tracks, and the minimum size of the designed filler cell is one routing track. In other words, only one routing track will be able to route through this cell 104. Routing track size is the minimum width of the track plus the minimum space to the next track.

In a standard logic cell library, there is seldom any logic cell 102 with a width of only one routing track but gaps 104 in between logic cells 102 of an ASIC 300 can be as small as one track. Special filler cells 430 of one routing track width can be designed to fill in the minimum gap of one routing track space.

Figures 6A, 6B:
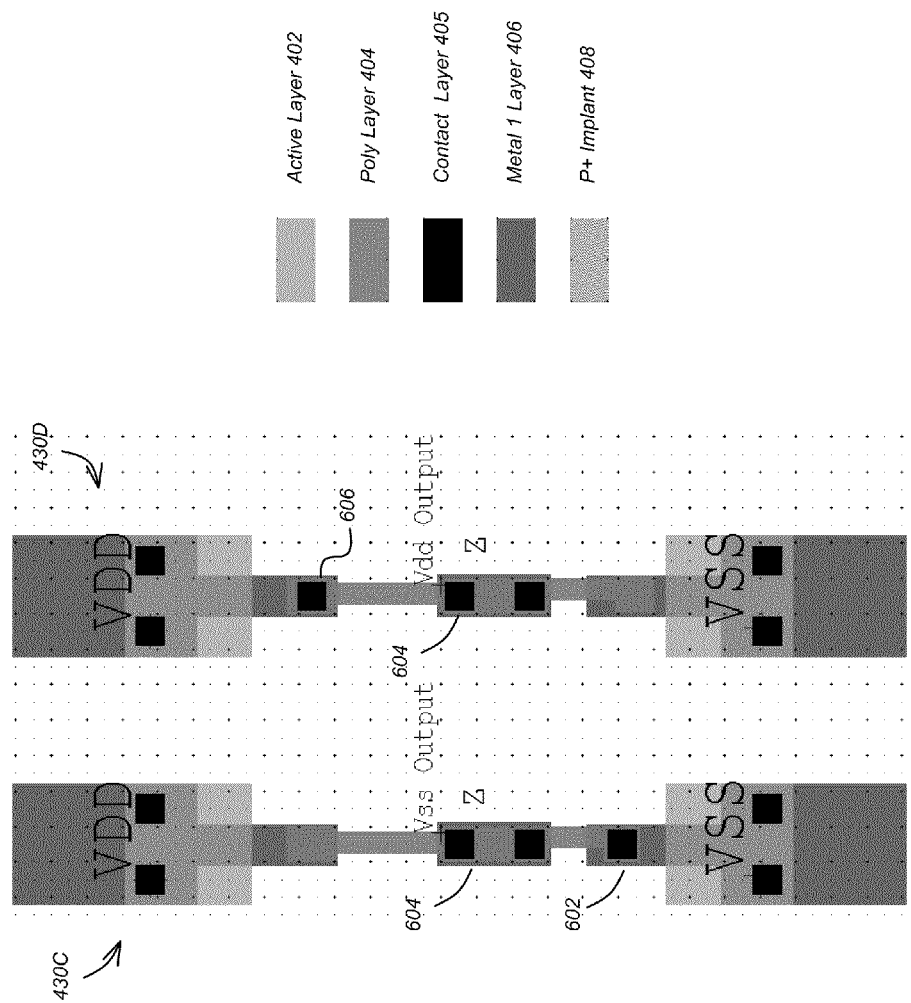
FIGS. 6A and 6B are diagrams depicting single track width filler cells.

FIGS. 6A and 6B are diagrams depicting single track width filler cells 430C and 430D. The filler cell 430C depicted in FIG. 6A uses contact 602 to short the output 604 (Z) to the voltage Vss (logical zero), and the filler cell 430D uses contact 606 to short the output 604 (Z) to voltage Vdd (logical one) through the poly layer 404. The active layer 402 is also present to increase the camouflage effect of these filler cells. Again, other camouflage techniques described in the references (e.g. U.S. Pat. Nos. 7,049,667, 6,815,816, 6,774,413, 6,924,522 etc.) can also be used to make the actual circuit connection of these filler cells difficult to be determined by reverse engineering.

Figure 7:
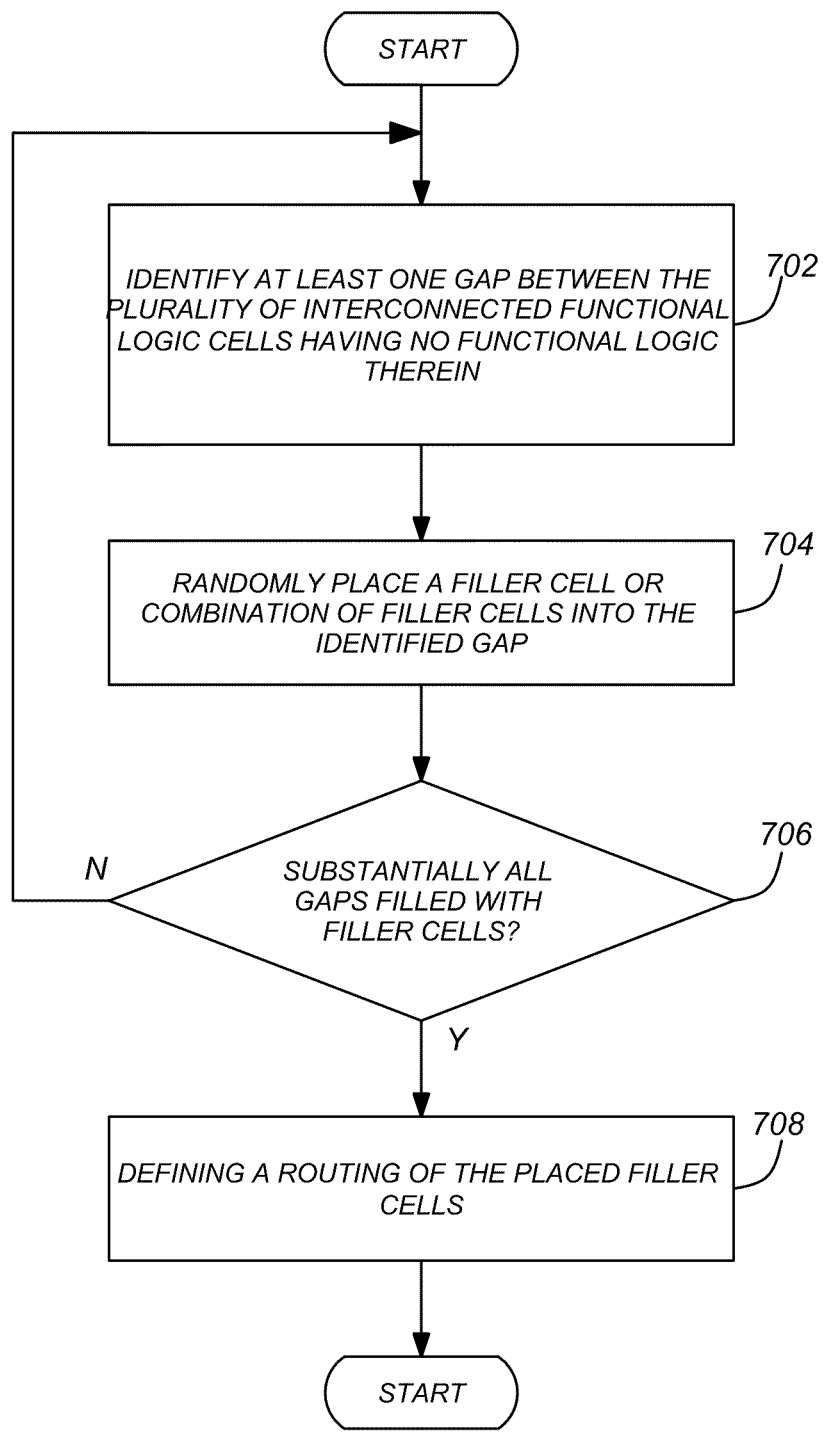
FIG. 7 is a flow chart illustrating representative method steps that can be used to practice one embodiment of the invention.

FIG. 7 is a flow chart illustrating representative method steps that can be used to practice one embodiment of the invention. In block 702, at least one gap 104 is identified between a plurality of interconnected functional logic cells 102. Such gaps 104 have no functional logic within their boundaries. Next, a filler cell 430 or combination of a plurality of filler cells 430 are placed into the identified gap 104, as shown in block 704. In one embodiment, the placement of filler cells 430 is accomplished randomly. This randomness can be implemented by randomly selecting from different filler cell 430 designs or different filler cell 430 combinations. As shown in block 706, the operations of block 702 and 704 are repeated until substantially all of the gaps 104 are filled with filler cells 430. This can be accomplished by running a computer program for the random placement of one filler cell or a combination of filler cells into the unused silicon area of the post Place and Route standard cell portion of the ASIC.

Figure 8:
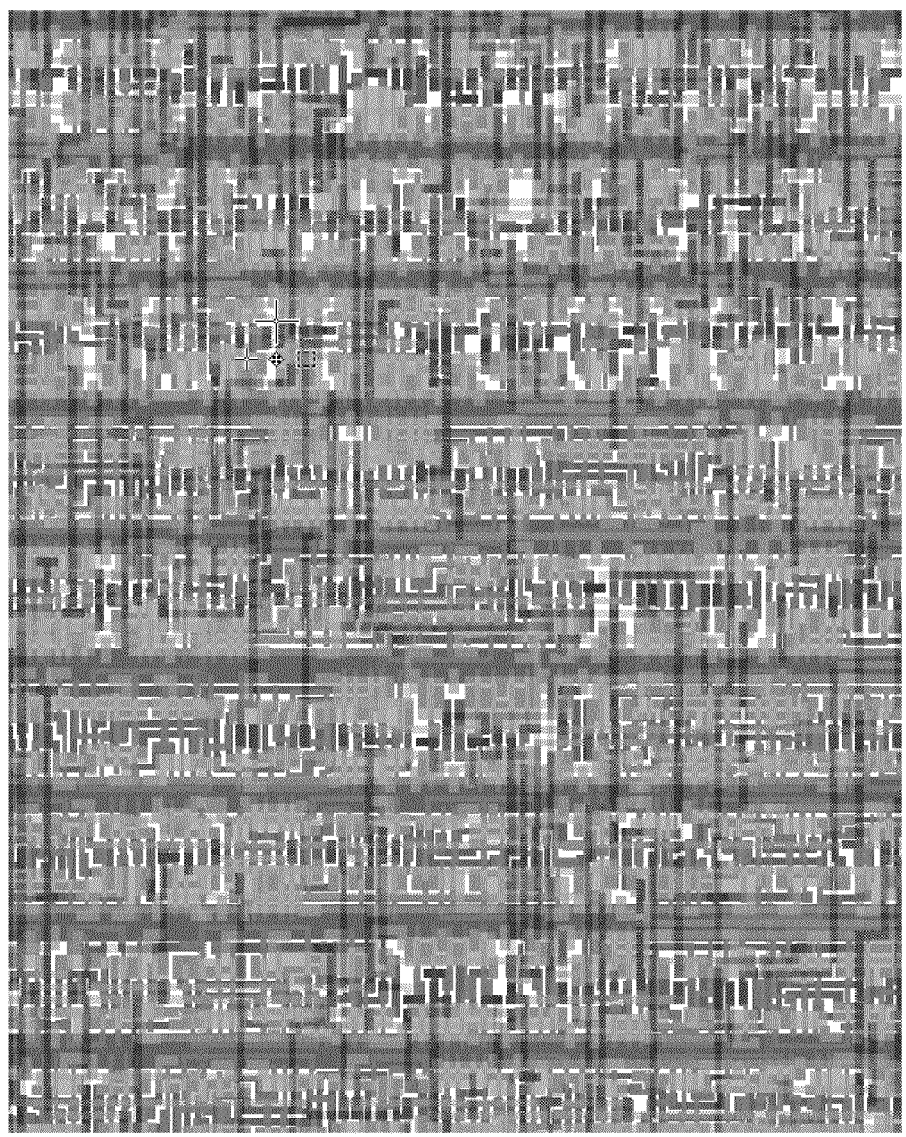
FIG. 8 is a diagram showing an exemplary ASIC after the completion of selected operations of FIG. 7.

FIG. 8 is a diagram showing an exemplary ASIC after the completion of the operations of blocks 702-706.

Figure 9:
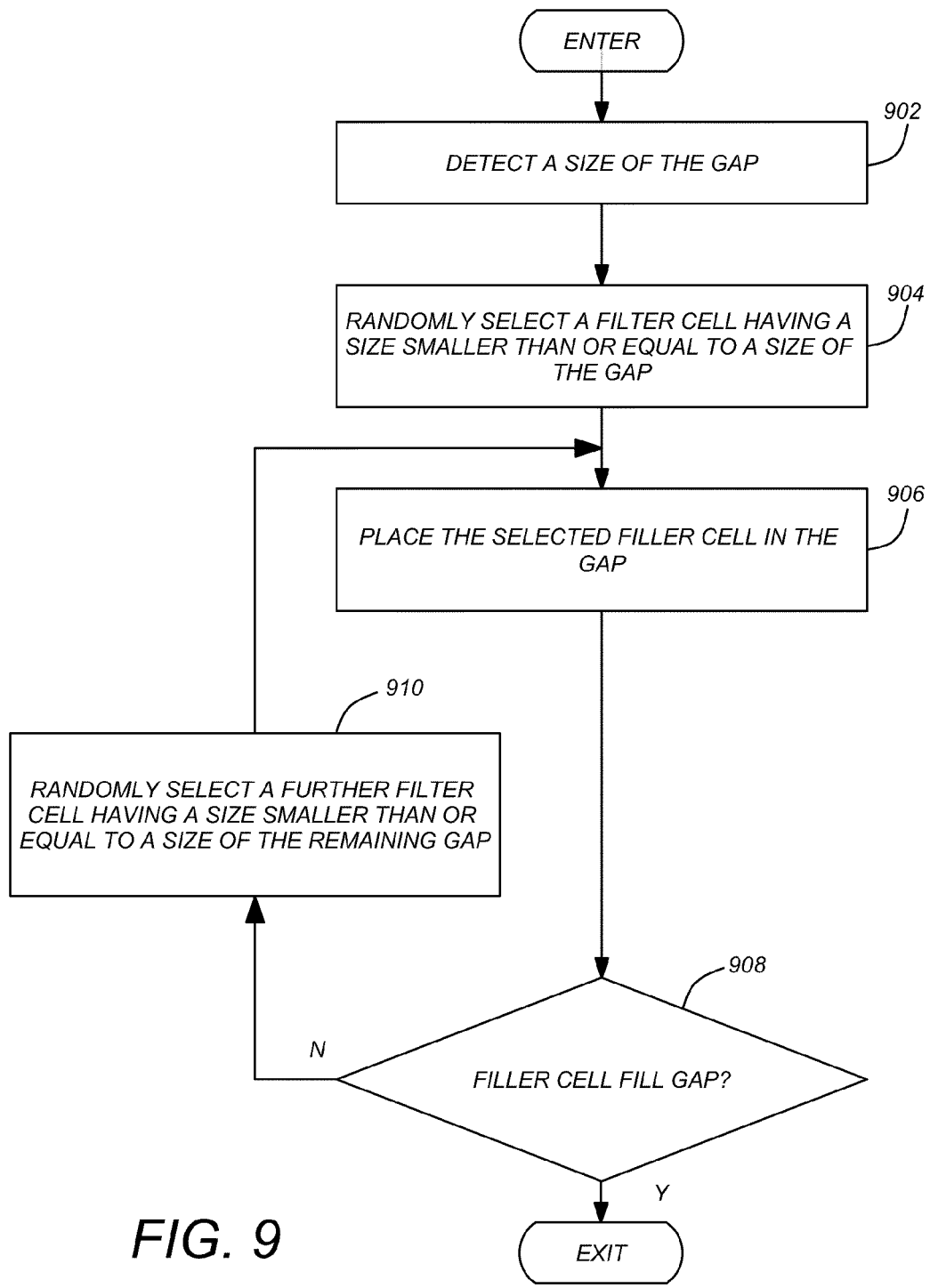
FIG. 9 is a diagram illustrating one embodiment of how filler cells or combinations of filler cells can be randomly placed into identified gaps.

FIG. 9 is a diagram illustrating one embodiment of how filler cells 430 or combinations of filler cells 430 can be randomly placed into identified gaps. As shown in FIGS. 1 and 2, the standard cell region of an ASIC is comprised of rows of placed logic cells with connecting conductive traces or wirings. After an ASIC design is finished, all the layer information of the design is stored in a graphical data system (GDS) file, ready to release for mask making. GDS is an industry accepted database file format for IC layout design. The GDS file describing the ASIC layout can be input to an algorithm or computer program and used to detect, in the standard cell region, each gap 104 (unused silicon area) in each row of logic cells, as shown in block 902. It then randomly picks a filler cell 430 from the newly designed filler cells 430 with a size smaller than or equal to the size of the gap 104, and places it in that gap 104, as shown in blocks 904-906. If the first randomly chosen filler cell 430 does not fully fill the gap 104, then another filler cell 430 with a size smaller than or equal to the remaining space is randomly selected and placed until the space is fully utilized, as shown in blocks 908-910.

In one embodiment, the filling program sequentially processes the ASIC layout from space to space and row to row until it finishes filling all the unused silicon areas in the standard cell portions of the die.

Returning to FIG. 7, the a routing is defined for the placed filler cells 430, as shown in block 708.

Figure 10:
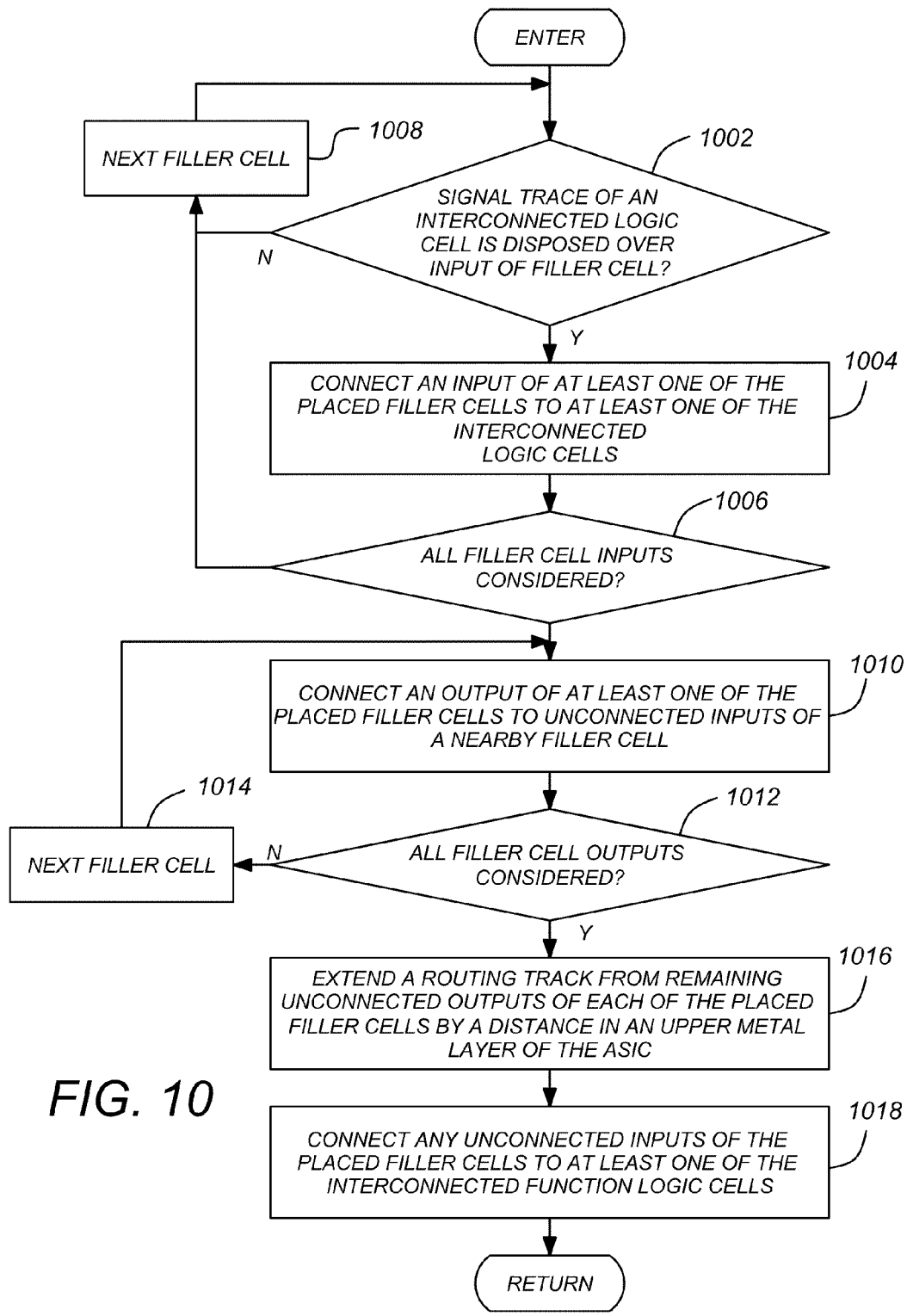
FIG. 10 is a diagram presenting exemplary operations that can be used to route the placed filler cells.

FIG. 10 is a diagram presenting exemplary operations that can be used to route the placed filler cells. The illustrated steps can be performed on a general or special purpose computer using interfaces standard to ASIC design programs.

The first routing connects the inputs of the filler cells to the existing ASIC network if those ASIC network signals go directly over the filler cell 430 inputs in the Metal 1 layer. Standard logic cells 102 and also the filler cells 430 are all designed such that inputs and outputs are in the metal 1 layer, making the higher metal layers available for routing between cells.

First, as shown in block 1002, the ASIC layout is examined to determine if a signal trace of an interconnected logic cell 102 is disposed over an input of a placed filler cell 430. If not, the next filler cell 430 is examined, as shown in block 1008. If a signal trace of an interconnected logic cell 102 is disposed over an input of a placed filler cell 430, an input of at least one of the placed filler cells 430 is connected to at least one of the interconnected logic cells 102, as shown in block 1004. This process is repeated until a desired number filler cell 430 inputs have been considered, as shown in block 1006. In one embodiment, all filler cells 430 inputs are connected to an interconnected logic cell 102 wherever possible.

Figure 11:
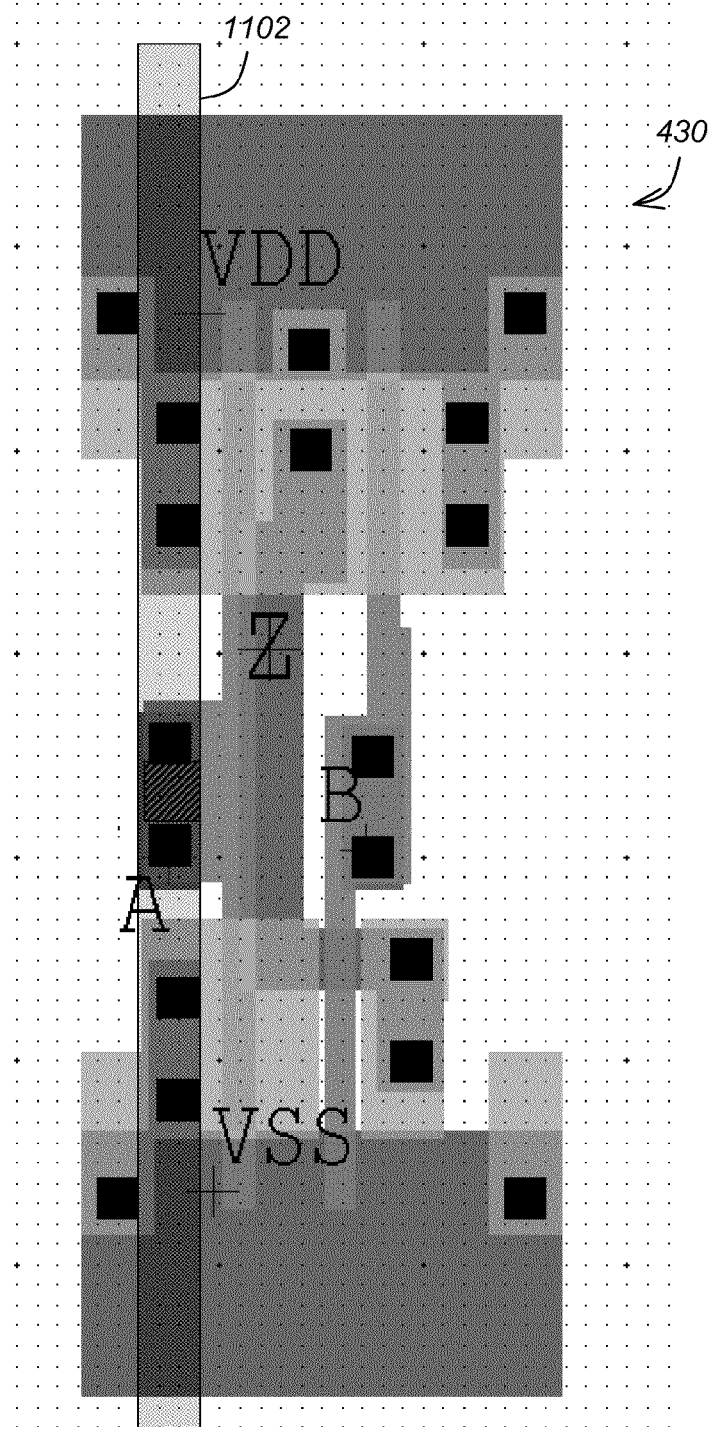
FIG. 11 is a diagram illustrating a signal wiring or trace in a metal 2 layer from the ASIC network running on top of the filler cell input A disposed in the metal 1 layer.

FIG. 11 is a diagram illustrating a signal wiring or trace 1102 in the metal 2 layer from the ASIC network running on top of the filler cell 430 input A disposed in the metal 1 layer 406. This condition is detected and a via is placed to connect the ASIC signal trace 1102 in the Metal 2 layer 202 to the filler cell 430 input A in the Metal 1 layer 406. The input of the filler cell 430 is recognized by the special 'input layer' in the filler cell design. Once an input of a filler cell 430 is connected, a routing program generates another identification layer to differentiate this filler cell 430 input from other (currently uncommitted or unconnected) filler cell 430 inputs. Since only the inputs of filler cells 430 are connected to the ASIC signals (and not the outputs), these connections result in only a minor increase of the capacitive loading on those tapped ASIC signals, and they will not change the ASIC logic function.

Next, the outputs of the filler cells 430 are connected (via signal traces) to nearby uncommitted inputs of other filler cells 430, as shown in block 1010.

Figure 12:
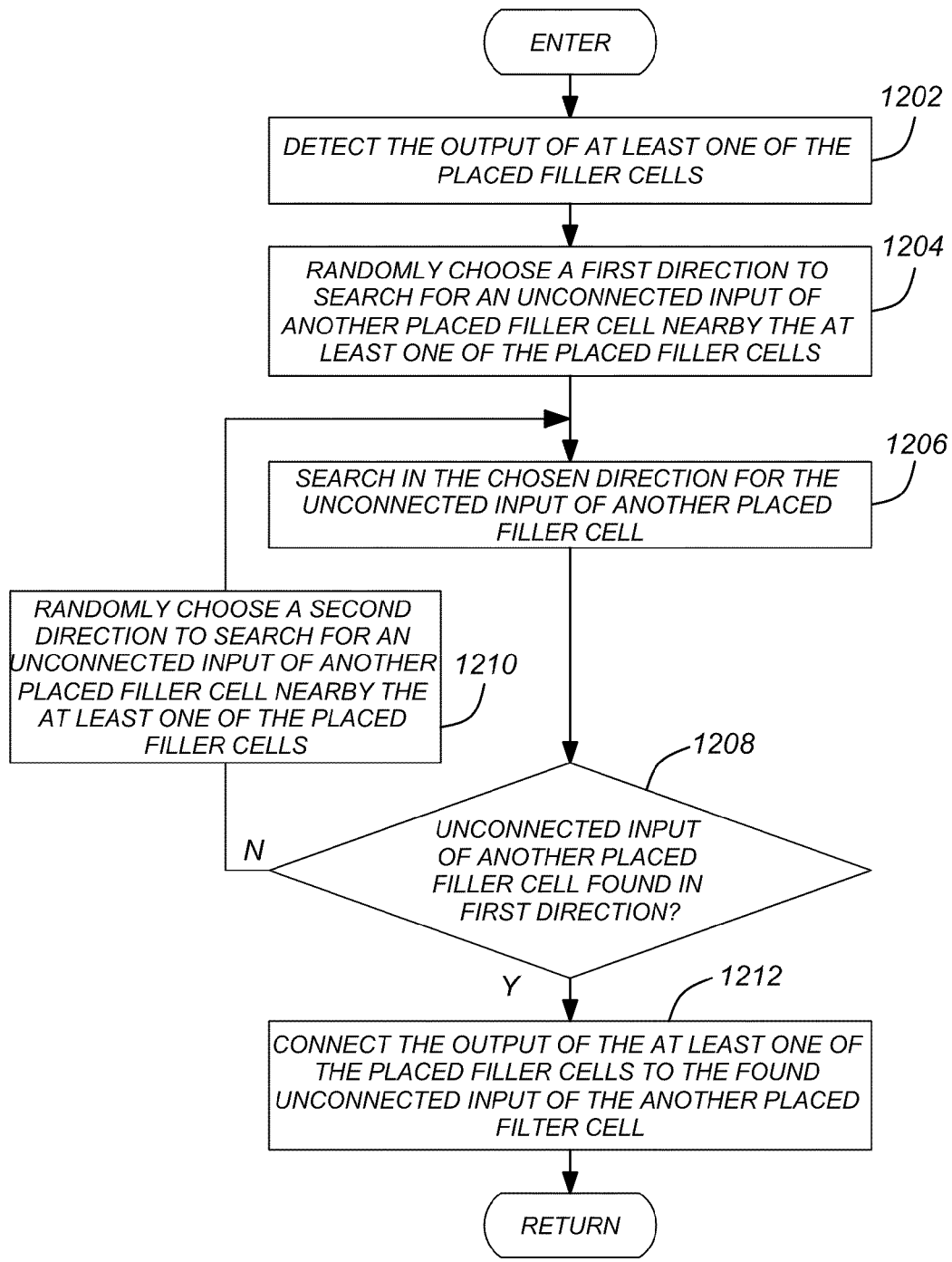
FIG. 12 is a flow chart illustrating exemplary method steps that can be used to connect filler cell outputs to nearby uncommitted inputs to other filler cells.

FIG. 12 is a flow chart illustrating exemplary method steps that can be used to connect filler cell 430 outputs to nearby uncommitted inputs to other filler cells 430. In block 1202, the presence of an output of a filler cell 430 is detected by the recognition of the output identification layer in the filler cell 430 design. Then, a direction is chosen (preferably randomly) to search for an unconnected input of another placed filler cell 430, as shown in block 1204. In one embodiment, the direction is chosen as either left, right, up or down to start a search and the search is performed within a certain 'search dimension' in width and length, for the presence of any input of other filler cells 430. A search is then performed in the chosen direction for an unconnected input of another placed filler cell 430, as shown in block 1206.

If an unconnected input of another filler cell 430 is identified, one or more layers of higher level metal layers and vias are used connect the output of the first identified filler cell 430 to the input of the second identified filler cell 430, as shown in block 1212. If the search does not find any other filler cell in one direction, it will start the search with another direction, which may also be chosen at random, a shown in blocks 1208 and 1210. At the same time, if an input of another filler cell 430 is identified but the routing program can not make the connection between the identified output and input (for example, due to wiring congestion or too many traces already located in the area between the output and input), it will start the search in another direction.

Returning to FIG. 10, the operations of block 1010 (which are described in more detail in FIG. 12) are repeated until all of the filler cell 430 outputs have been considered, as shown in blocks 1012 and 1014.

The 'search dimension' is a parameter controlling the area (length and width) of the search. If this dimension is too large, the time of each search may become excessively long, while a search dimension that is too small will result a high percentage of filler cell 430 outputs not able to find any other filler cell 430 input to make a connection. The value of the 'search dimension' can be optimized based on the size and routing trace congestion level of the ASIC.

In general, the 'search dimension' is defined in terms of the number of metal routing tracks in horizontal direction and the number of rows of logic cells in the vertical direction. Optimal 'search dimension' values can be between '1 row by 50 tracks' to '5 rows by 500 tracks'.

Another parameter used in the second routing program is the 'number of inputs' to which an identified output will be connected. The 'number of inputs' parameter can also be a randomly chosen number for each identified filler cell 430 output with a value between 1 and 6, for example. The 'number of inputs' parameter determines the maximum number of filler cell 430 inputs for which an identified filler cell 430 output is to be connected. This parameter value is also equivalent to the maximum number of input searches that will be performed for each identified filler cell 430 output. For example, if the value is randomly picked at '2' for a specific filler cell 430 output, this output will be connected to '2' or fewer inputs of other filler cells 430 (some searches may end up with no connection due to wiring congestion). In this example, this portion of the routing process will stop after the second search-and-route process for this filler cell 430 output.

In one embodiment, an attempt is made to connect the output of every placed filler cell 430 to some input of other filler cells 430. The identification of a filler cell 430 output is through a special "identification" layer designed in the filler cell 430. The identification layer is a special design layer that is defined to differentiate this filler cell from the other ASIC standard logic cells (when the presence of this layer is detected, the cell is a filler cell). The identification layer can be thought of as a layer that is "opaque" over the regions of filler cells and "transparent over regions of functional logic cells, but is not physically realized in the ASIC. To find a filler cell output, the identification layer can be examined in each row of cells of the ASIC standard cell region.

Figure 13A:
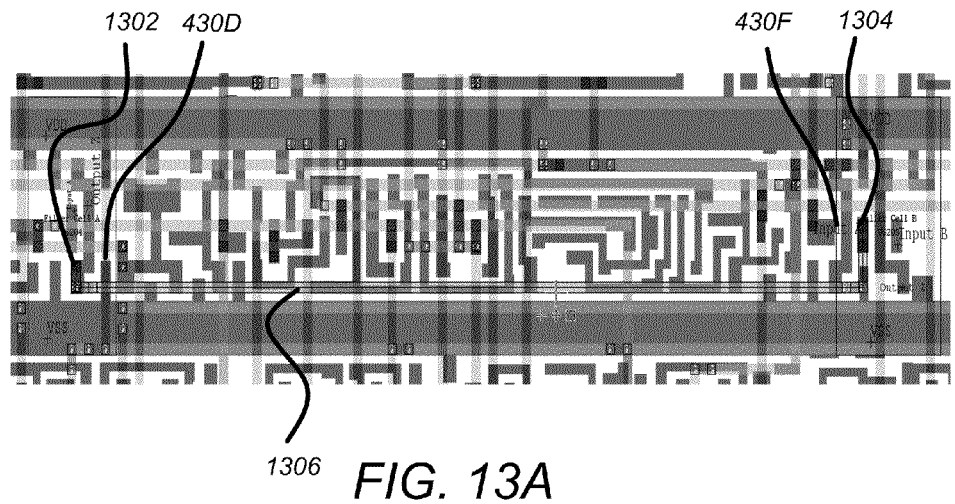
FIGS. 13A and 13B are diagrams illustrating a portion of an ASIC, showing an example of a trace routed by using described techniques.
Figure 13B:
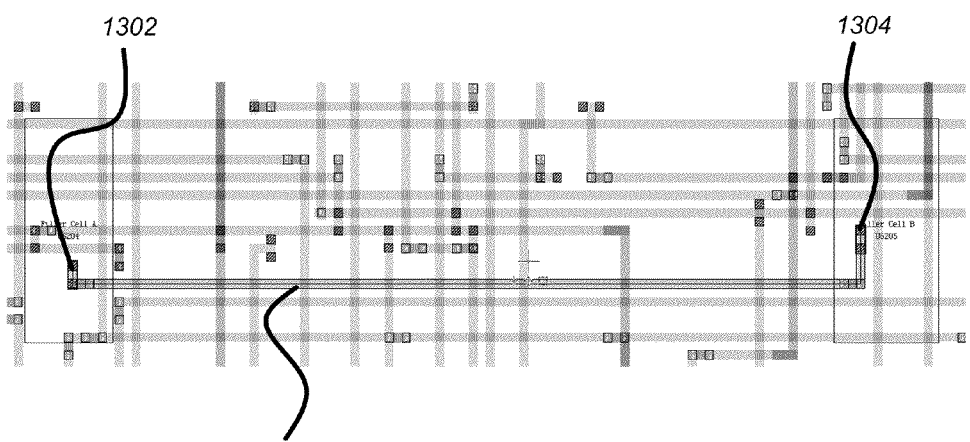

FIGS. 13A and 13B are diagrams illustrating a portion of an ASIC, showing an example of a trace routed by using the foregoing technique. The output of a filler cell 1302 is identified, and a search is made in the horizontal direction to find the nearest filler cell 430 input 1304, resulting in the routing of a metal trace 1306. FIG. 9A shows the several layers of the ASIC including the metal 1, via 1, metal 2, via 2, metal 3 and via 3 and metal 4 layers. FIG. 9B illustrates the same ASIC and routing as FIG. 9A, but does not depict the metal 1 layer, thus providing a clearer view of the connection wire (or signal trace) defined using the technique described above. An output 1302 for the filler cell 430D at the left was detected, and it was randomly determined to search horizontally to the right of the filler cell 430D. Within the predefined 'search dimension' (in this example, 2 rows by 50 tracks) another filler cell 430F was found with its input A 1304 uncommitted. A wiring connection 1306 from the output of the first filler cell 430D to the input of the further filler cell 430F was defined. This wiring connection 1306 was routed in the Metal 2 layer to via 1, touching down to the output or input in the Metal 1 layer of both filler cells 430D and 430F, then with the Metal 3 layer and Via 2 making the final connection between the two traces in the Metal 2 layer. In this example, the parameter 'number of inputs' was picked randomly to be 1. Therefore, the process stops further searches after one input is routed to this identified output.

There are two scenarios in which the output of a filler cell 430 will complete the foregoing processes and remain with no connection with a connection to the input of another filler cell 430. The first is if no input of any other filler cell 430 is identified after searching in all four directions. The second is, when the ASIC wiring in that specific area is congested to the point that no wiring connection is possible within the 'search dimension'.

Returning to FIG. 10, for these remaining unconnected filler cell 430 outputs after the performance of the operations of blocks 1002-1012 of FIG. 10, operations are performed to extend the routing track or wiring connection of the uncommitted filler cell 430 output to a distance by wiring in higher metal and via layers of the ASIC, as shown in block 1016. The goal of this extension is not to target the connection between outputs and inputs of filler cells 430. Instead, its purpose is to camouflage the filler cell 430 output by connecting to that filler cell 430 output what appears to be a functional routing wire.

Figure 14:
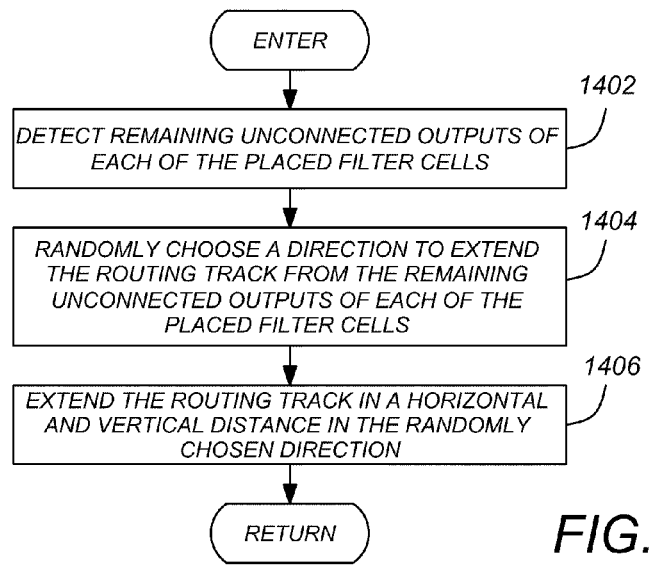
FIG. 14 is a diagram illustrating exemplary method steps that can be used to extend a routing track from remaining unconnected outputs of the placed filler cells.

FIG. 14 is a diagram illustrating exemplary method steps that can be used to extend a routing track from remaining unconnected outputs of the placed filler cells 430, as described in block 1016 of FIG. 10.

First, block 1402 detects the unconnected filler cell output of each of the placed filler cells 430. Block 1404 then picks a direction (e.g. left, right, up or down) to extend the routing track from the remaining unconnected outputs of each of the placed filler cells 430. The direction may be randomly chosen. Then, a routing track or wiring connection is extended from the filler cell 430 output to higher metals through vias, thus extending the output signal of the filler cell 430 to a horizontal and vertical distance along the chosen direction. This is shown in block 1406.

The 'total horizontal length' and the 'total vertical length' of wiring are the two controlling parameters that define the horizontal and vertical metal length by which the router can extend the output connector. The process described in FIG. 14 will stop the horizontal metal extension when the actual extended horizontal length of the metal reaches the specified 'total horizontal length'. It also stops the vertical extension if the same condition for vertical extended metal is met. In the example described here, the metal 1 and metal 3 layers may be used for horizontal extension while the metal 2 and metal 4 layers may be used for vertical extension. For each filler cell 430 output being extended, the parameters of the 'total horizontal length' and the 'total vertical length' can be chosen to be a random number in microns (um) between 10-200.

Preferably, the extended metal wiring is realized as much as possible in the highest level of metal layers (e.g. the metal 4 layer for vertical extension and the metal 3 for horizontal extension). This is for two reasons. The first is to avoid the metal 2 and metal 1 layers, which are typically more congested due to the routing between functional logic cells 102 in the ASIC. This is because ASICs usually consume more of the lower metal layers, metal 2 and metal 1, for inter-cell 102 routing and for internal connections within the logic cells 102. The other purpose of having the filler cell 430 outputs extended to higher metal layers is to prepare for the future possible tapping of these extended output signals to metal features created in the metal fill process. Examples of the metal fill process are described in U.S. Pat. No. 6,924,552, which is hereby incorporated by reference herein. The metal fill process in can also be used to fill up all unused metal tracks to further camouflage the ASIC to protect it from reverse engineering.

The metal fill process will produce a large number of floating metal structures that can be differentiated by the voltage contrast technique in a reverse engineering process using a scanning electron microscope. Connecting some of these filled metals to known potentials will make them look like real connectors under voltage contrast. Due to the fact that reverse engineering starts the attack with the highest layer of metal, a floating metal trace at the highest level will reveal that both it and the traces in the lower metal layers connected to it are false connectors. Hence, it is desirable to have as many as possible of the highest-level metal traces generated from the metal fill process connected to a known voltage potential. Bringing the filler cell 430 output voltages, either Vdd or Vss, to the highest level of metal layer (the metal 4 layer in this discussion) makes the tapping of the high layer metals generated from the metal fill process easier and will result in a higher percentage of such high level metals being connected to known potentials.

In areas with highly congested routing wires, the third routing program will stop when there is no possible route for the continuation of the metal layer extension before the specified 'total extended length' is reached.

Figure 15:
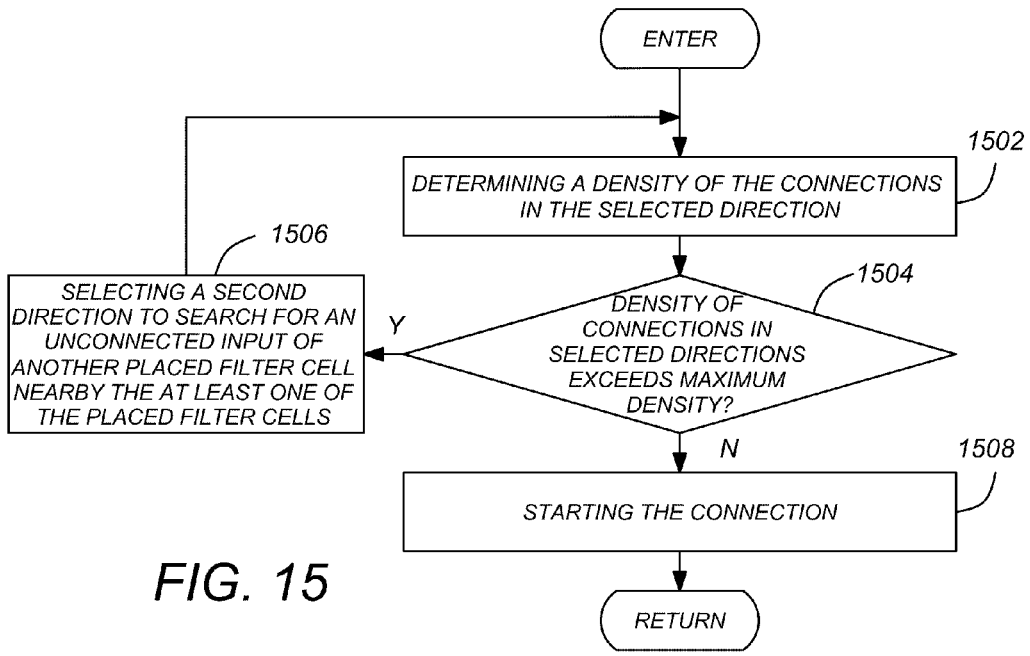
FIG. 15 is a diagram illustrating exemplary method steps that account for the situation where no possible routes are definable.

FIG. 15 is a diagram illustrating exemplary method steps that account for the situation where no possible routes are definable (e.g. due to congestion). First, the density of connections in the selected direction is determined, as shown in block 1502. If the density of connections exceeds a maximum density, a different direction is selected, as shown in blocks 1504-1506. If the density does not exceed the maximum density, the connection is begun in the selected direction and extended the desired length, as shown in block 1408.

Figure 16:
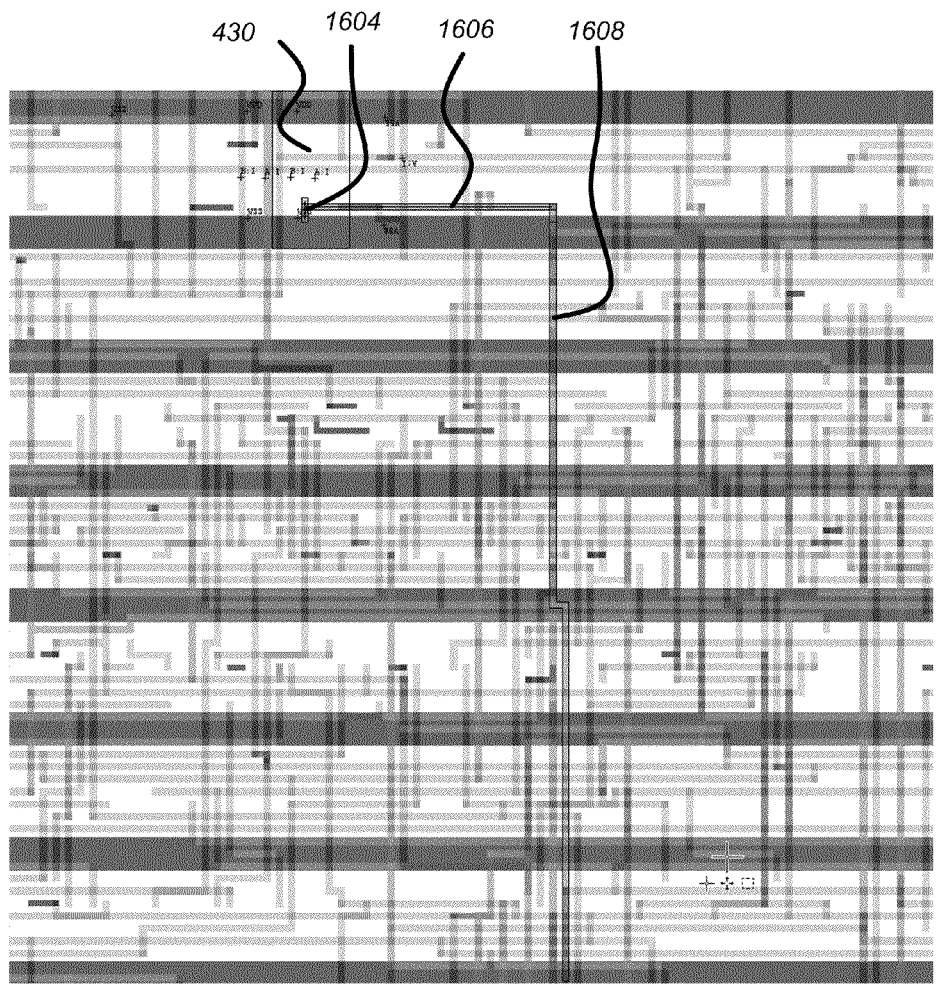
FIG. 16 is a diagram illustrating an exemplary result of the extension process.

FIG. 16 is a diagram illustrating an exemplary result of the extension process described above. An output 1604 of a filler cell 430 being extended 8 um horizontally in the metal 3 layer by a first trace portion 1606 and 25 um vertically in the metal 4 layer 1608.

After the third routing, the outputs of placed filler 430 cells are connected to some higher metal layers and extended a distance away from the filler cells 430. However, there are still some filler cell 430 inputs which are not connected anywhere and left floating.

Figure 17:
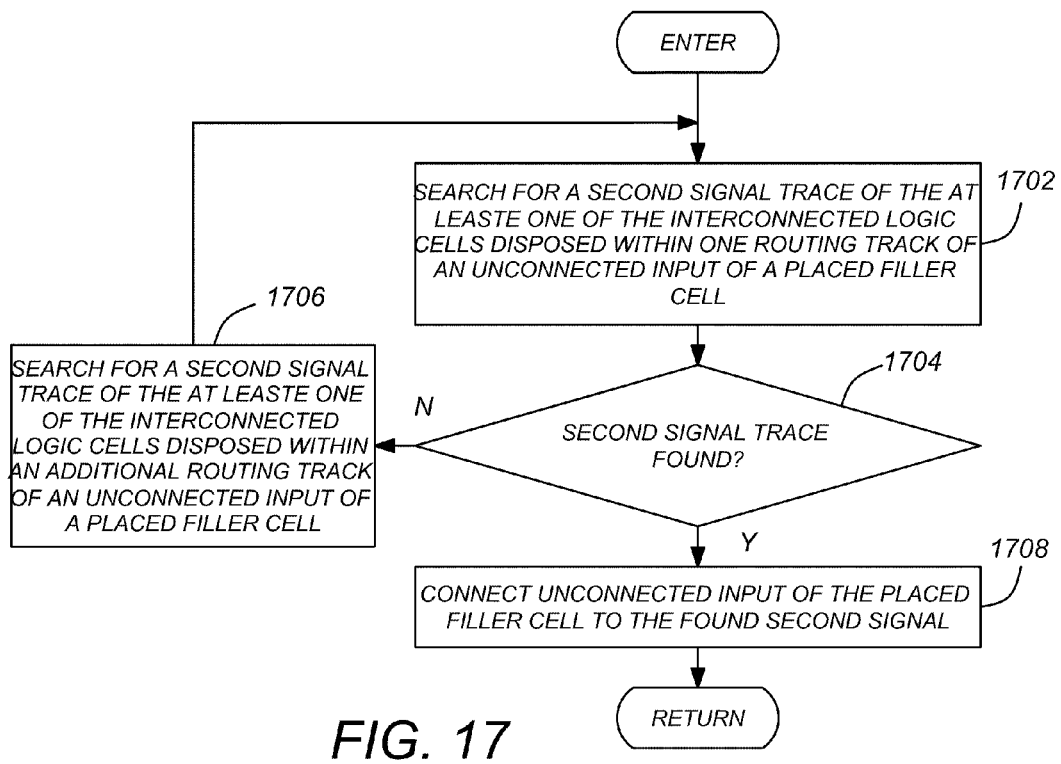
FIG. 17 is a diagram illustrating exemplary method steps that can be used to connect the remaining filler cell inputs to further ASIC logic cell signals.

FIG. 17 is a diagram illustrating exemplary method steps that can be used to connect the remaining filler cell 430 inputs to further ASIC logic cell 102 signals.

A search is performed for a second signal trace of at least one of the ASIC signals in the interconnected logic cells 102 (not signals from the output of the filler cells 430) disposed within one routing track of a floating (unconnected) input of a placed filler cell 430, as shown in block 1702. Typically, this search is performed in the metal 2 layer.

If a second signal trace is found, the unconnected input of the placed filler cell 430 is connected to the found second signal, as shown in block 1708. This can be accomplished by creating a connection between the floating filler cell 430 input to the chosen signal using higher metal layers and vias.

If a second signal trace is not found within one track, an expanded search is performed until an interconnected logic cell 102 signal is found, as shown in blocks 1704 and 1706. Typically, the search is expanded by searching for a second signal trace of an interconnected logic cell 102 within two signal tracks, then three signal tracks, until a second signal trace is identified. This process continues until a second signal trace is found or is determined to be unavailable. In case more than one signal is found within the same distance from the floating input node of the filler cell, one of them is picked at random.

Figure 18A:
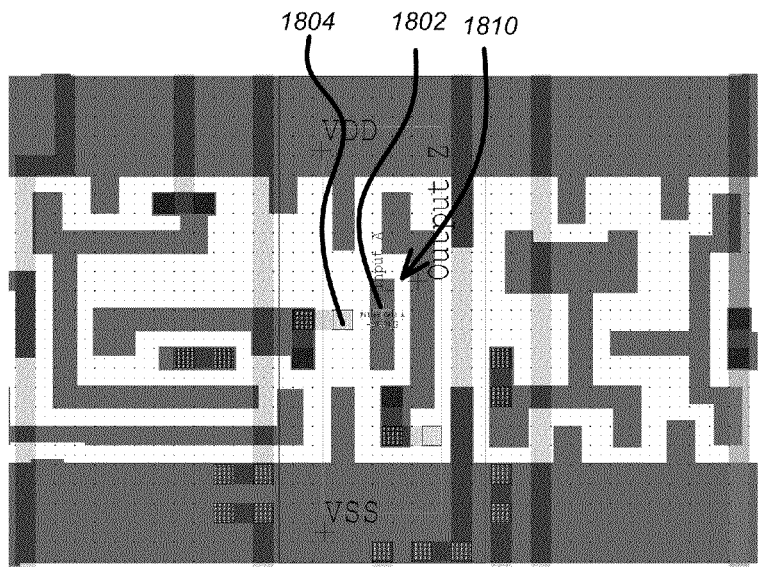
FIG. 18A is a diagram showing an example of a signal trace found one track away from a floating unconnected input of a filler cell.
Figure 18B:
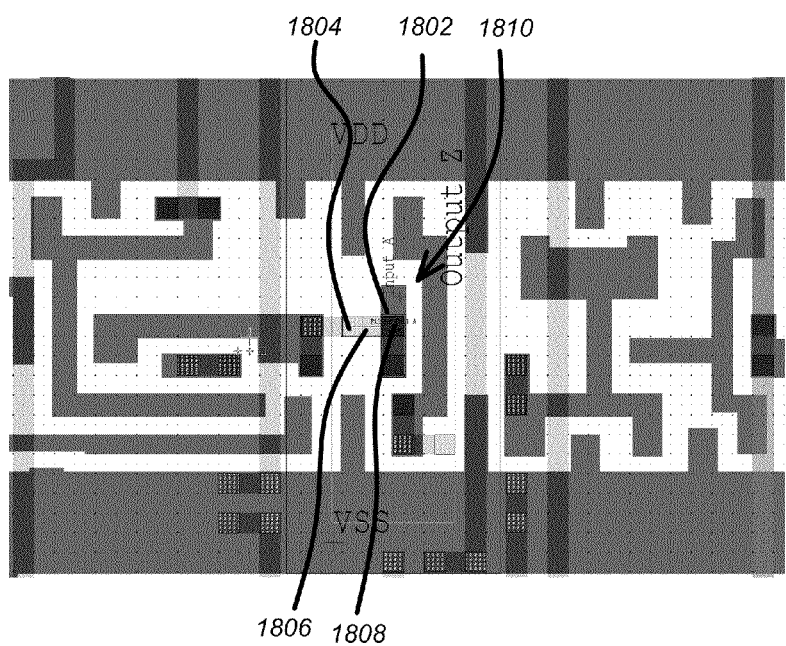
FIG. 18B shows a connection between the filler cell input and a chosen ASIC signal 1804.

FIG. 18A is a diagram showing an example of a signal trace 1804 found one track away (and to the left) from the floating unconnected input A of filler cell 1810 in the metal 2 layer 1802, on the left side of the unconnected input A of the filler cell. FIG. 18B shows the connection in via 1 and metal 2 layers created between the filler cell input A 1802 and the chosen ASIC signal 1804.

At this point, all filler cell 430 inputs and outputs are connected or extended to some higher level metal layers.

Next, a metal fill process can be performed to generate ASIC-like routing metal wirings and vias to fill up all unused routing channels available in the ASIC areas. An exemplary method to perform this metal fill process is described in U.S. Pat. No. 6,924,552, which is hereby incorporated by reference herein. The metal fill process is a very strong ASIC protection technique that increases the quantity of image information that a reverse engineer has to analyze by 5 to 10 times.

Because a floating metal wire can be easily identified using voltage contrast techniques with a scanning electron microscope, the effect of the metal fill process in protecting ASIC from reverse engineering can be enhanced by connecting as many metal fill wirings as possible to a known voltage.

After the metal fill process, another process can be performed to propagate the output voltage of filler cells 430 to the floating metals generated by the metal fill process described above.

Figure 19:
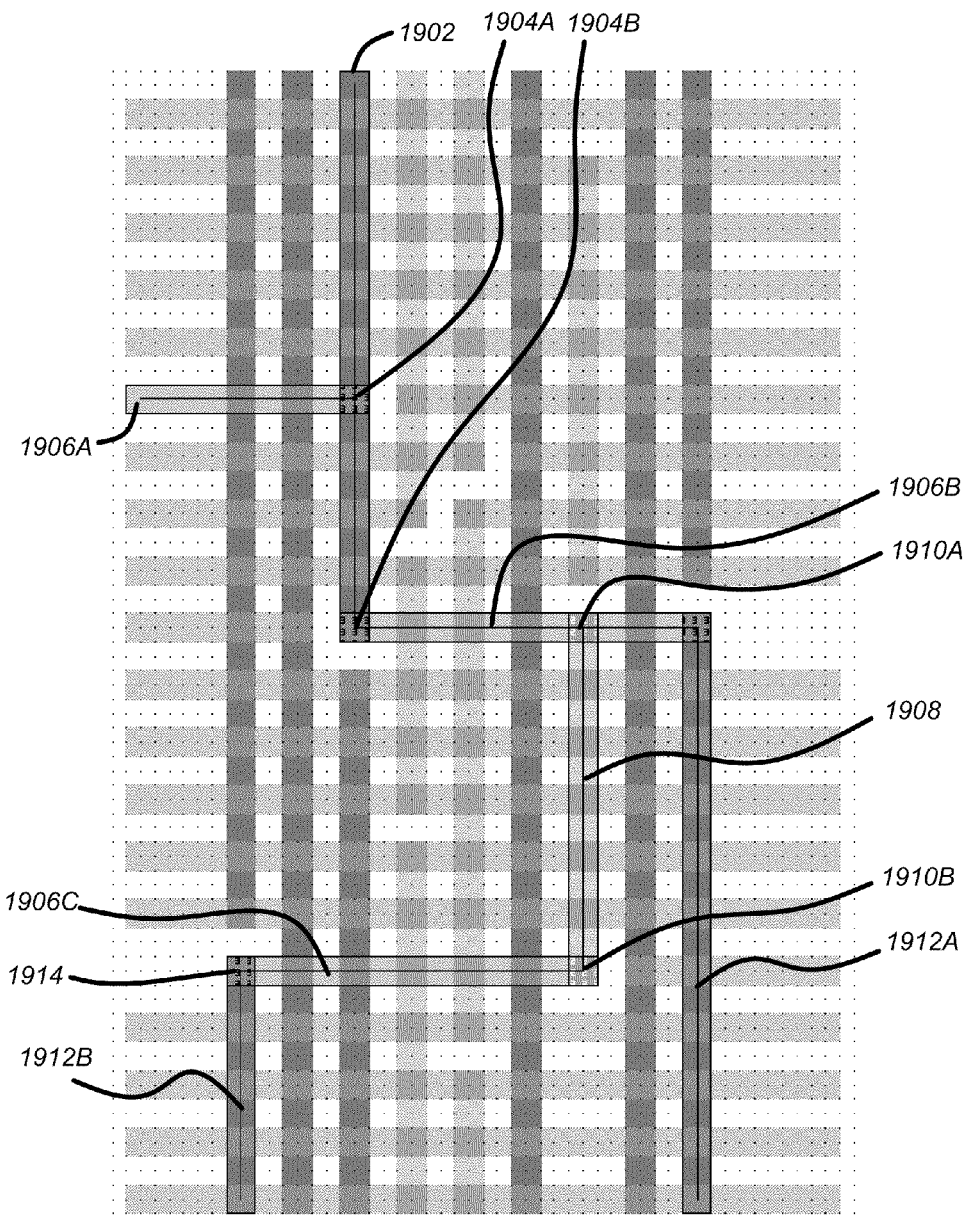
FIG. 19 is a diagram showing an illustration of the process of propagating the output voltage of filler cells to floating metals generated by the metal fill process.

FIG. 19 is a diagram showing an illustration of the process of propagating the output voltage of filler cells 430 to floating metals generated by the metal fill process. In the illustrated example a filler cell extension 1902 has been generated in the metal 4 layer as described in FIG. 14. Further, the above-described metal fill process is performed in the metal 3 and metal 4 layers, resulting is traces 1908 (created in the metal 2 layer), 1906A, 1906B and 1906C (created in the metal 3 layer).

This process starts with the filler cell output extension in the metal 4 layer generated from using the process illustrated in FIG. 14, then searches for any areas in the metal 3 layer filled using the metal fill process above its end region lying just under that piece of extension in the metal 4 layer. Once such a filled metal 3 is found, the process generates a via 1904B at an endpoint of the Metal 3 layer trace 1906A connecting the extended Metal 4 level trace 1902 to the filled Metal 3 layer trace 1906B. These filled Metal 3 layer traces carry the voltage potential of the filler cell 430 output after they are connected with the via 1904B.

The process may propagate the filler cell output voltage present at 1902 further by repeating the same extension process described above. The process then searches for any metal 2 layer trace from metal fill process with its endpoint lying exactly under the connected metal 3, and places a Via 2 1910A there to connect the filled metal 2 layer trace 1908 to the metal 3 layer trace 1906B, as shown in FIG. 19. The result is that the filler cell 430 outputs propagate through the metal 4 layer extension 1902 generated earlier to some filled metal 3 layer trace 1906A, 1906B, and additionally to some filled metal 2 layer trace 1902 generated in the metal fill process. Filled metal 2, 3 and 4 layer traces here are referring to the metal layers traces created in the metal fill process.

This routing process forms connections between a higher metal layer traces (metal 4) to lower metal layers traces (metal 3 and metal 2). The process also forms connections from the lower filled metal 2 layer traces to higher level filled metal 3 traces, and again to the filled metal 4 layer traces as long as the endpoint overlap condition of the two adjoining metal layers is met. This type of connection is shown in FIG. 19 where a metal 2 geometry trance 1908 is connected to the filler cell 430 output (by extension 1902) in the earlier propagation process, and is further connected to another of filled metal 3 layer trace 1906A-1906C.

A similar extension from filled metal 3 layer trace 1906C to filled metal 4 layer trace 1912B and connection by via 1914 is also shown in the FIG. 19. The propagation of the output signal in the fifth routing program will stop when it cannot find any more endpoint overlap of metal layers. Using the metal layer endpoint overlap as a condition for the propagation (as opposed to making inter-layer connections elsewhere along the traces) makes sure the created connection has a similar appearance to the normal wiring of an ASIC. Note that the process need not investigate the metal 1 layer traces, since all possible metal 1 empty spaces were already used during the placement of the filler cells 430.

There are two filler cell 430 output voltages, Vdd and Vss. A further process may be used to start first with those filler cell 430 outputs at the Vdd potential and carry out the propagation of the Vdd voltage to the filled metal layers. After finishing the Vdd output propagation, all the filled metals connected to Vdd will be identified and restricted from the next extension step. This is a process connecting the filled metal traces to the output of 'some' filler cells. Since there are two types of filler cell outputs either at Vdd or Vss, separating the extension process into 'Vdd only' and 'Vss only' avoids the possibility of shorting the Vdd to Vss in the extension. The routing is from the outputs of the filler cells. However, these outputs are all (internally) connected to either Vdd or Vss). Then, filler cell outputs at Vss are propagated to the rest of the filled metals. The purpose of separating the process into the foregoing two steps is to avoid any possible short between Vdd and Vss during the propagation of metal connections.

Figure 20:
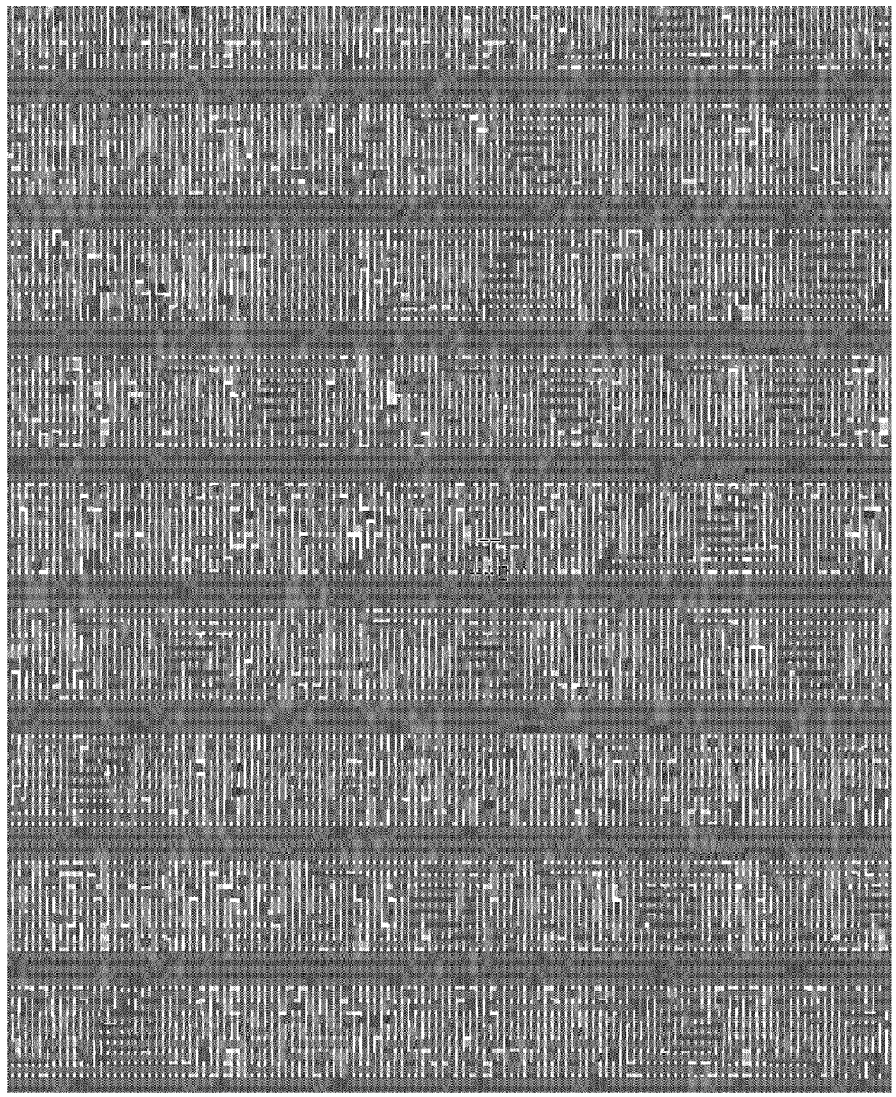
FIGS. 20 and 21 show the final layout of a portion of the ASIC after going through the filler cell placement and all the wire routing procedures described herein.
Figure 21:
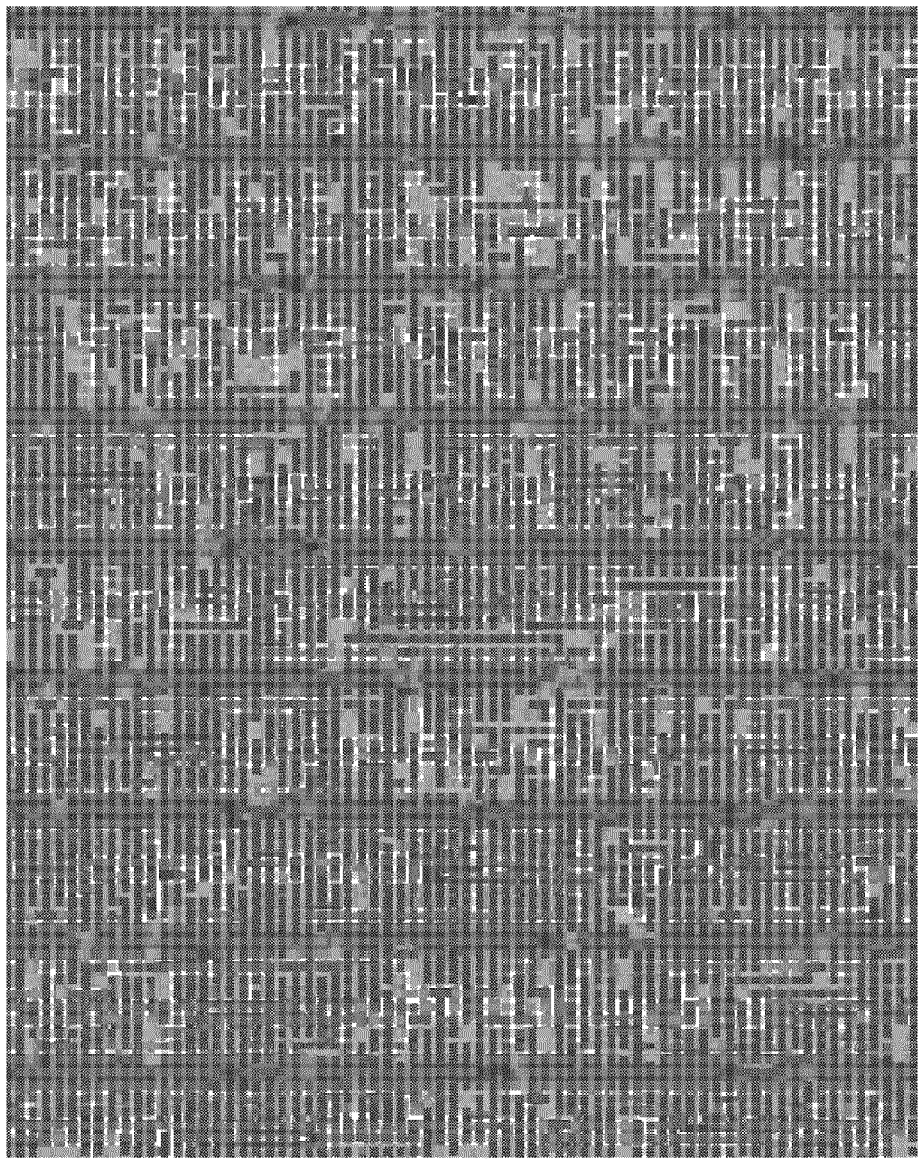

At the end of this process, the ASIC 100 will contain many times more data than the original design, which makes the reverse engineering effort much more difficult. FIGS. 20 and 21 show the final layout of a portion of the ASIC after going through the filler cell placement and all the wire routing procedures described above. FIG. 20 displays only metal layers so as to show the camouflage effect in the metal wiring, while FIG. 21 shows all layers of the ASIC 100 design.

The ASIC 100 camouflage technique described above involves the addition of specially designed filler cells 430 and wiring connections in, preferably, all metal layers. These wiring connections occur from filler cells 430 to filler cells 430, from filler cells 430 to the logic cells 102 of the ASIC 100, and from filler cells 430 to floating metals generated in the metal fill process.

This process can be performed on the final GDS release of an uncamouflaged ASIC 100 design, and thus there will not be any impact on the uncamouflaged ASIC 100 design. The physical size of the ASIC's silicon die (die area) will not be changed since all added circuits and wires use only the unused silicon areas and the vacant metal tracks available in the ASIC 100. Although some filler cell 430 inputs are connected to the ASIC 100 circuit network, the ASIC 100 logic function is not altered. However, there will be a minor increase in the capacitive loading of the tapped ASIC logical cell 102 outputs (due to the added connections to the inputs of the filler cells and to the proximity of the additional filler metal traces). A timing analysis of the post-camouflage ASIC may be performed to verify the timing requirements of the ASIC 100 before production release.

During the reverse engineering of an ordinary ASIC 100, the chip is imaged layer by layer under optical or scanning electron microscopy. The effort first focuses on identifying the function of logic cells 102 by extracting their circuit connections. The logic cell 102 extraction process is very straight forward for a standard cell library with no protection.

An ASIC design usually uses 200 to 300 distinct cells from the standard cell library. Reverse engineering can recognize hundreds of these logic cells in an ASIC within one to two weeks. Because of the unique layout of every logic cell 102, a signature of each logic cell 102 can be established in the metal 1 layer (which is used for device connections within the cell 102). Once logic cells 102 are recognized through circuit analysis, reverse engineering can use the metal 1 layer pattern as a recognition layer to identify the logic cells 102 in the ASIC 100. By recognizing the pattern in metal 1 layer, reverse engineering does not need to re-analyze the circuit for other instances of that logic cell 102. Hence, to pirate a 100-thousand-gate ASIC 100 design, the circuit analysis effort will be the same as a 1-thousand-gate design.

After the circuit extraction and identification of the two to three hundred library cells, extracting the ASIC netlist can begin by tracing the metal wire connections throughout the images of the ASIC's metal layers. Due to the addition of the special filler cells 430 with the same metal 1 layer pattern as a standard logic cell 102, an ASIC 100 protected with this invention will invalidate the reverse engineering assumption of a unique metal 1 pattern for each logic cell 102. Reverse engineering is forced to review all the device formation layers (Active, Poly, Implants and Contact) of every cell in the ASIC 100 area to determine its logical function. This will multiply the circuit extraction and cell identification effort by many times. This technique is even more effective for ASICs 100 with relatively large gate counts. The metal wirings generated in the different routing programs will make these filler cells 430 appear to be part of the ASIC 100 logic and make it difficult to sort them out.

For the camouflage of the metal wiring, the metal fill process described in the '552 patent is effective in resisting reverse engineering attempts to extract the logic netlist. However, many wires generated using this metal fill process are floating and are not driven by any voltage source. They are detectable by voltage contrast techniques with a scanning electron microscope (SEM). The voltage contrast techniques give different brightness levels to connectors or nodes in an ASIC 100 under a SEM according to their voltage potential. Any floating highest level metal layer (Metal 4 in this disclosure) from the metal fill process can be identified with this technique and eliminated from the image data during reverse engineering. Lower levels of floating metal layers, although identified by voltage contrast imaging, can not be eliminated in a reverse engineering effort since some real ASIC 100 routing connectors will show as floating after the de-layering of the higher metal layers. The last process described above provides a high percentage of otherwise floating metals from the metal fill layers with logic level potentials of either Vdd or Vss. This provides a strong enhancement to the metal fill process.

Further Embodiments

Other camouflaging techniques can be used either in addition to or in alternative to those described above. For example, combinations of filler cells 430 and logic cells 102 can be created and inserted into the functional logic cells, in such a way that the insertion does not affect the function performed. This can be accomplished by generating a logical description of a cell combination comprising a plurality of filler cells 430 (or filler cells 430 and logic cells 102) using predetermined input and output points.

Figure 22:
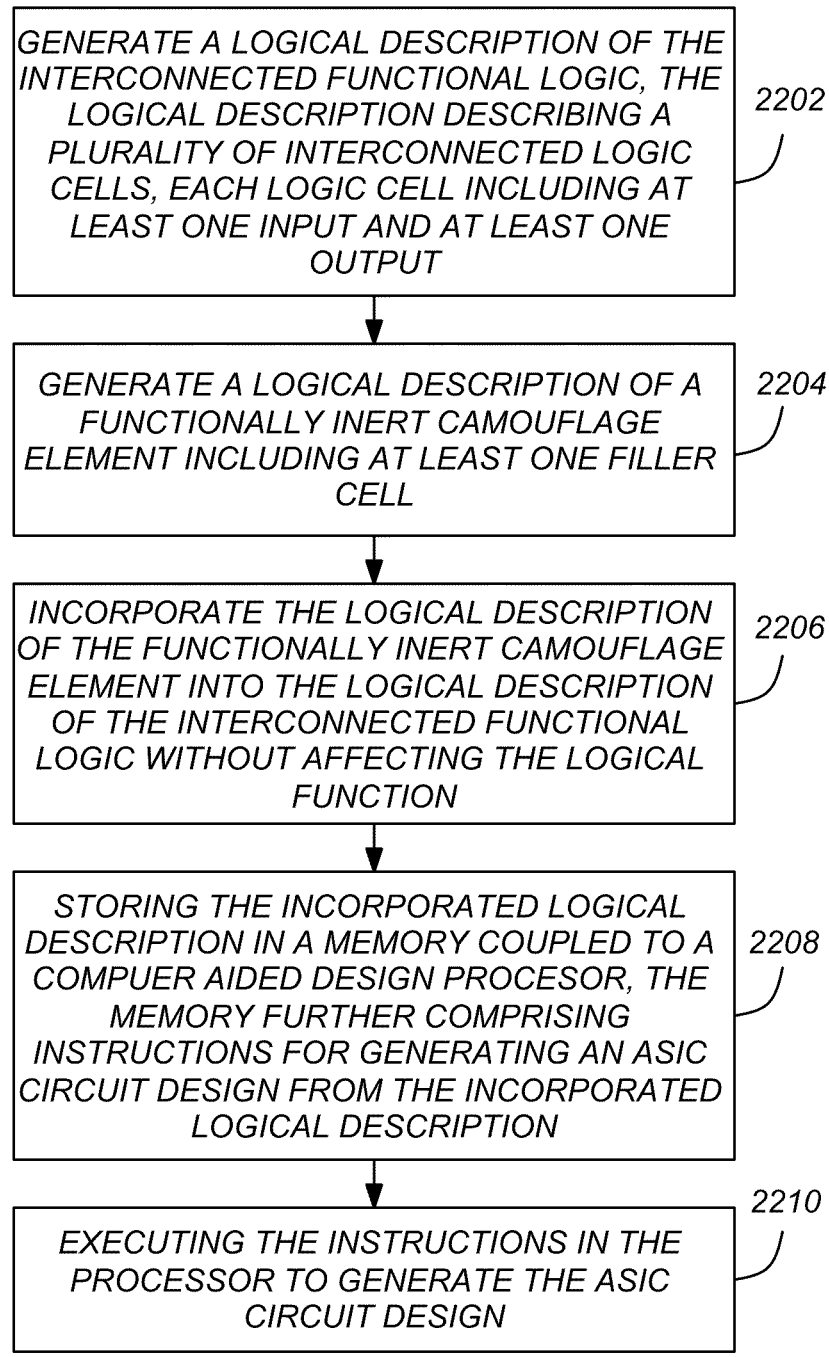
FIG. 22 is a flowchart illustrating further exemplary steps that can be used to camouflage a circuit.

FIG. 22 is a flowchart illustrating exemplary steps that can be used to camouflage a circuit. As shown in block 2202, a logical description of interconnected functional logic is generated, wherein the logical description describes a plurality of interconnected logic cells.

Figure 23:
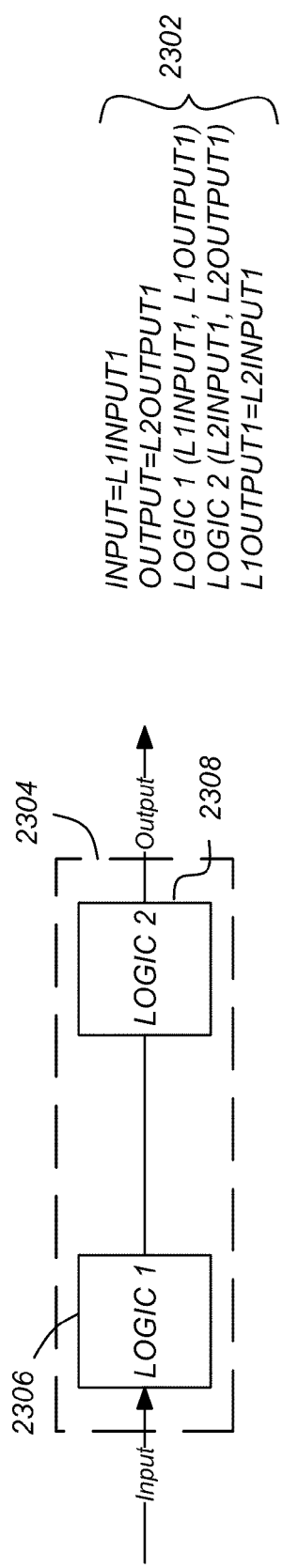
FIG. 23 is a diagram illustrating an exemplary embodiment of a logical description of interconnected functional logic or cell combination performing a desired logical function.

FIG. 23 is a diagram illustrating an exemplary embodiment of a logical description 2302 of interconnected functional logic 2304 or cell combination performing a desired logical function. The interconnected functional logic 2304 comprises logic cell 1 2306 and logic cell 2 2308.

Returning to FIG. 22, a logical description 2402 of functionally inert camouflage element that includes a filler cell 2410 is generated, as shown in block 2204.

Figure 24:
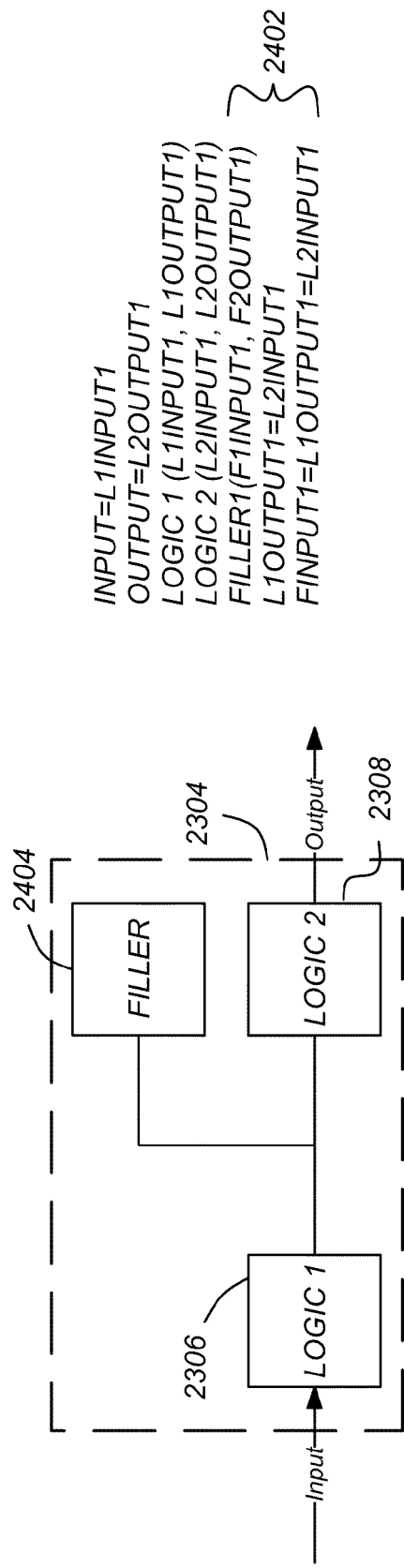
FIG. 24 is a diagram showing an embodiment of a functionally inert filler cell.

FIG. 24 is a diagram showing an embodiment of a functionally inert filler cell 2404. The logical description of the functionally inert camouflage element 2402 is incorporated into the logical description of the interconnected functional logic, as shown in block 2206 and illustrated in FIG. 24. In the context of the present invention, a "functionally inert camouflage element" refers to one or more individual elements, when combined together and integrated with the baseline (non-modified) circuit design, do not affect the logic function of the baseline circuit design. For example, note that since the output of logic cell 1 2306 is still supplied to the input of logic cell 2 2308, the addition of the filler cell 2404 does not affect the logical function of the interconnected functional logic 2304.

Figure 25:
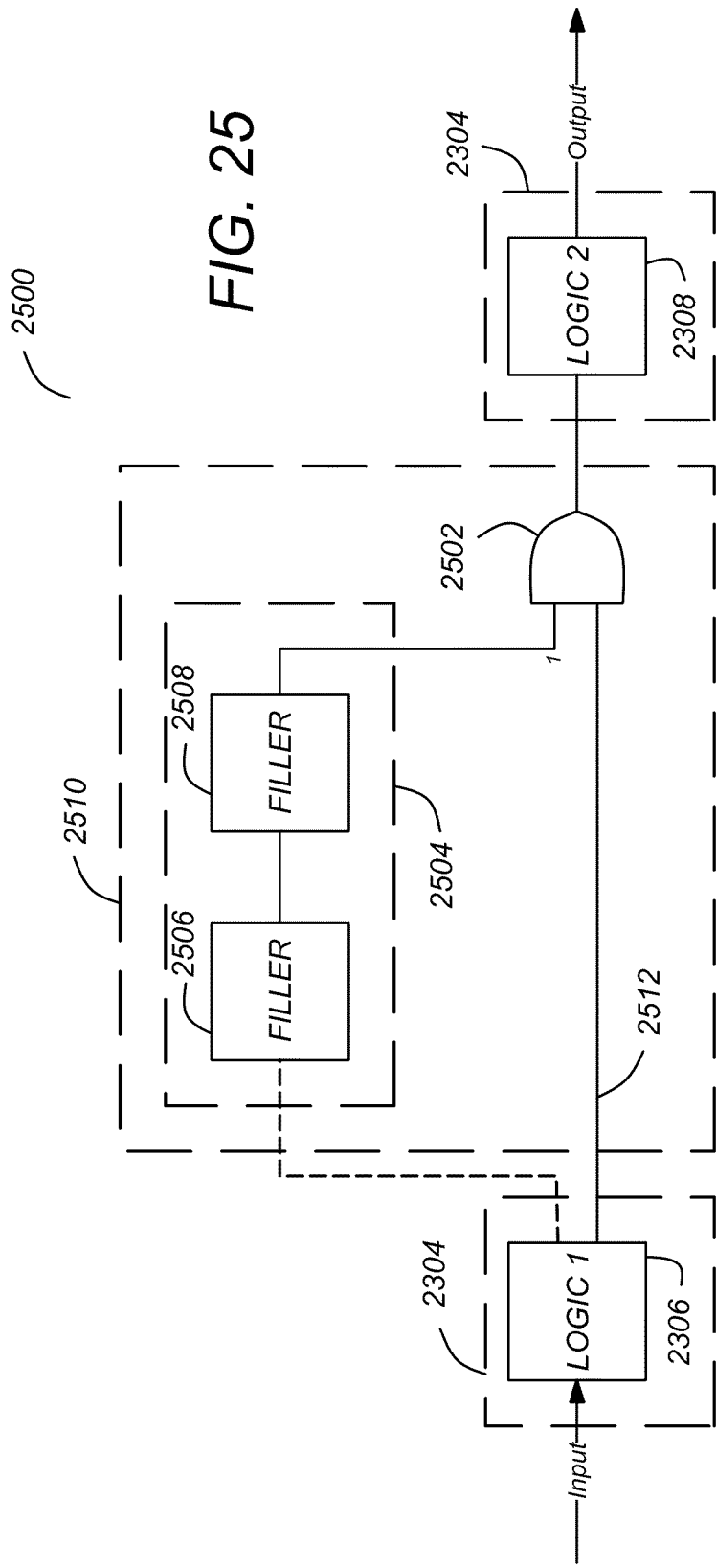
FIG. 25 is a diagram illustrating another example of the insertion of a functionally inert filler cell.

FIG. 25 is a diagram illustrating another example of this technique. In this example, a camouflaging element 2510 comprising a 2 input AND gate 2502 and a filler cell combination 2504 is used to camouflage the operation of logical cell combination 2202. In this example, the output of logic cell 1 2306 is provided to the input of logic cell 2 2308 via the filler cell 2510. In particular the output of logic cell 1 2306 is provided to one of the inputs to the 2-input AND gate 2502, and the output of the 2-input AND gate 2502 is provided to logic cell 2 2308. The output of the filler cell combination 2504, which is configured to always be logic ONE, is connected to the other input of the 2-input AND gate 2502. In this way the added filler cells 2506, 2508 would appear to be a functional part of the circuit, but, in fact, would not effect the function of the unmodified circuit or logical combination 2304. For further camouflaging, the filler cell combination 2504 may receive input from first logic cell 2306 to generate the logic ONE, as shown by the dashed line. The filler cell combination 2504 may generate the logical ONE by a combination of logic gates that always produce an output of one (e.g. $A \oplus B \oplus \overline{A}$) or the output of the filler cell combination 2304 may simply be tied to a positive voltage $V_{DD}$.

The use of either or both of the foregoing examples would not substantially increase the effort to design the ASIC, and will also have little or no effect in the later stages of layout and verification. Further, if only a relatively small number of filler cells are used in this manner, there little or no impact on the size of the final chip.

The foregoing techniques can also be used to design and use additional standard cells that have substantially the same appearance of the standard cells in the original cell library, yet perform a different logic function. Such cells could be randomly dispersed in the cell netlist at the appropriate point in the design flow. For example, a cell could be designed, using the techniques described in U.S. Pat. Nos. 7,049,667, 6,815,816, and 6,774,413 (which patents are hereby incorporated by reference herein), so that it appears identical to FIG. 4A in the layers shown, but performs a two-input NOR function instead of the NAND function of FIG. 4A. This makes it extremely difficult to determine the true function of the circuit by reverse engineering.

The present invention can also be used to create one or more logical descriptions (e.g. netlists) of combinations of filler cells (or combinations of filler cells and logic cells or combinations of filler cells, logic cells and filler cells) which, when combined, have the same logical function, but which have intermediate logical functions that are different than the uncamouflaged designs. Such combinations would, instead of having inputs which are ignored and/or fixed logic level outputs as described above, would have at least one active input and at least one active output which is some logical function of the active input(s). The circuitry of the true logic function of the combination would be hidden by spreading the logical function over a greater number of cells. The true logic function is further obscured in that it is distributed across a plurality of apparent logic cells instead of occurring in just one cell as would be expected.

Figure 26:
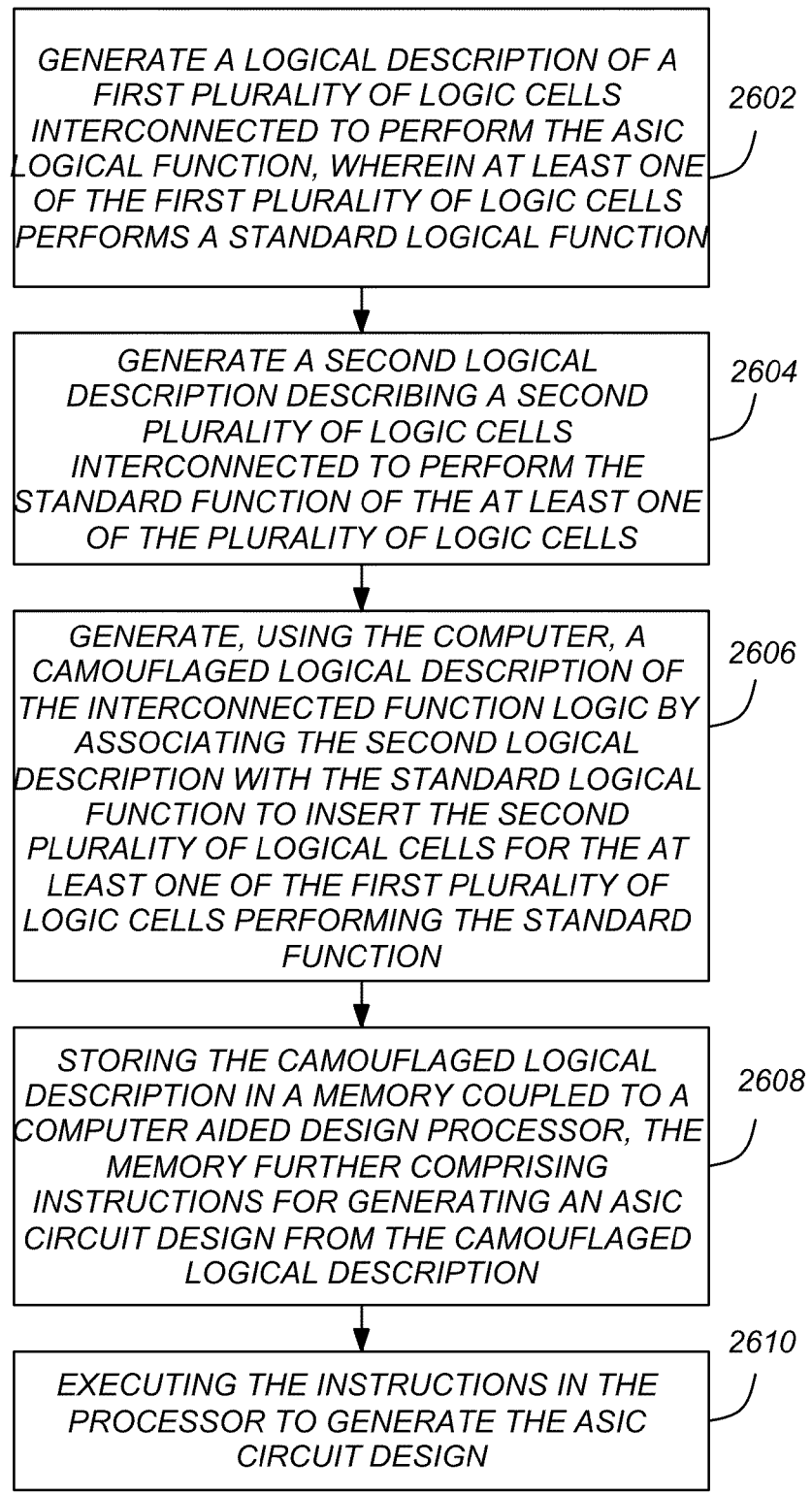
FIG. 26 is a diagram illustrating further exemplary method steps that can be used to camouflage a circuit.

FIG. 26 is a diagram illustrating further exemplary method steps that can be used to camouflage a circuit. First, a logical description of a first plurality of interconnected logical cells that performs the ASIC function is generated, as shown in block 2602. At least one of the plurality of logic cells performs a standard logical function such as a logical AND, OR, NOR, EXCLUSIVE OR, or DELAY. Next, as shown in block 2604, a second logical description is generated that describes a second plurality of logic cells that are interconnected to perform the standard function described above. The second logical description differs from that of the plurality of logic cells that are used to implement the same standard logical function by standard cells in the cell library. Then, in block 2606, a camouflaged description is generated by associating the second logical description with the standard logical function. Thus, when the computer assembles the logic cells together to create the circuit design of the ASIC, the computer will select and insert the second plurality of logic cells for the plurality of logic cells ordinarily associated with the standard function.

In block 2608, the camouflaged logical description is stored in a memory of the computer having instructions for generating an ASIC circuit design from the camouflaged logical description. The instructions are then executed to generate the ASIC circuit design, as shown in block 2610. The ASIC circuit design defines the topology of the layers which physically realize the ASIC.

Figure 27:
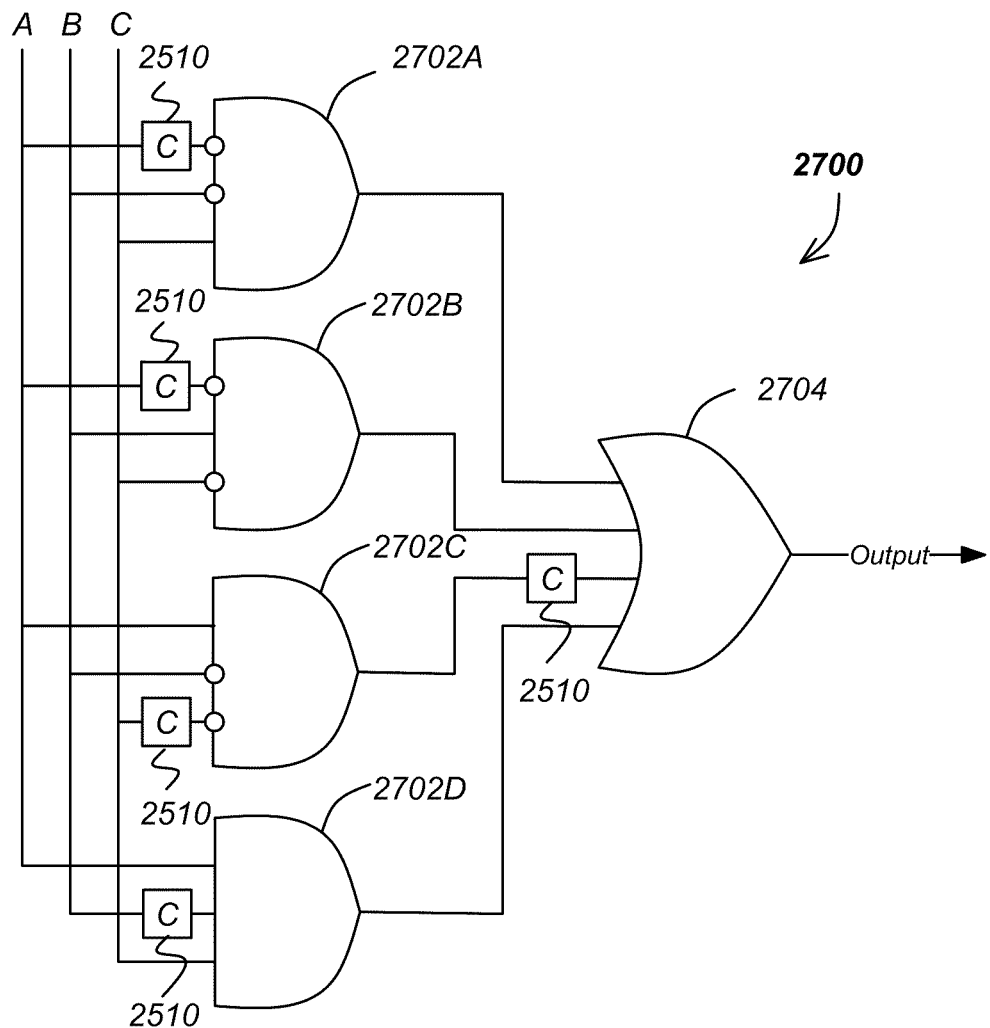

FIG. 27 is a drawing illustrating an example of this camouflaging technique. The logic circuit 2700 is an implementation of a three-input logical "exclusive or" (XOR) gate, that provides the result A XOR (B XOR C). However, since this is logically equivalent to $\overline{ABC} \oplus \overline{A}B\overline{C} \oplus A\overline{BC} \oplus ABC$, logic circuit 2700 implements an equivalent logical functionality using a plurality of interconnected AND gates 2702A-2702D, inverters, and OR gate 2704. Karnaugh mapping and other methods can be used to determine logically equivalent circuits for camouflaging. The function of the logic circuit 2700 can be further camouflaged by insertion of camouflaging elements 2510 described above.

This embodiment may be implemented as follows. First, the netlist or logical description of the plurality of cells performing the desired function is given a cell name that can be associated with its true logic function (in the illustrated example, the function A XOR (B XOR C) can be associated with the interconnected cells that implement AND gates 2402A-2402D and OR gate 2404). The computer automated design (CAD) system is then instructed insert this netlist instead of the usual logic function single cell where appropriate. The CAD system may insert the netlist implementing $\overline{ABC} \oplus \overline{A}B\overline{C} \oplus A\overline{BC} \oplus ABC$ for all instances of A XOR (B XOR C) or may do so randomly for each instance of the logic function in the circuit.

Figure 28:
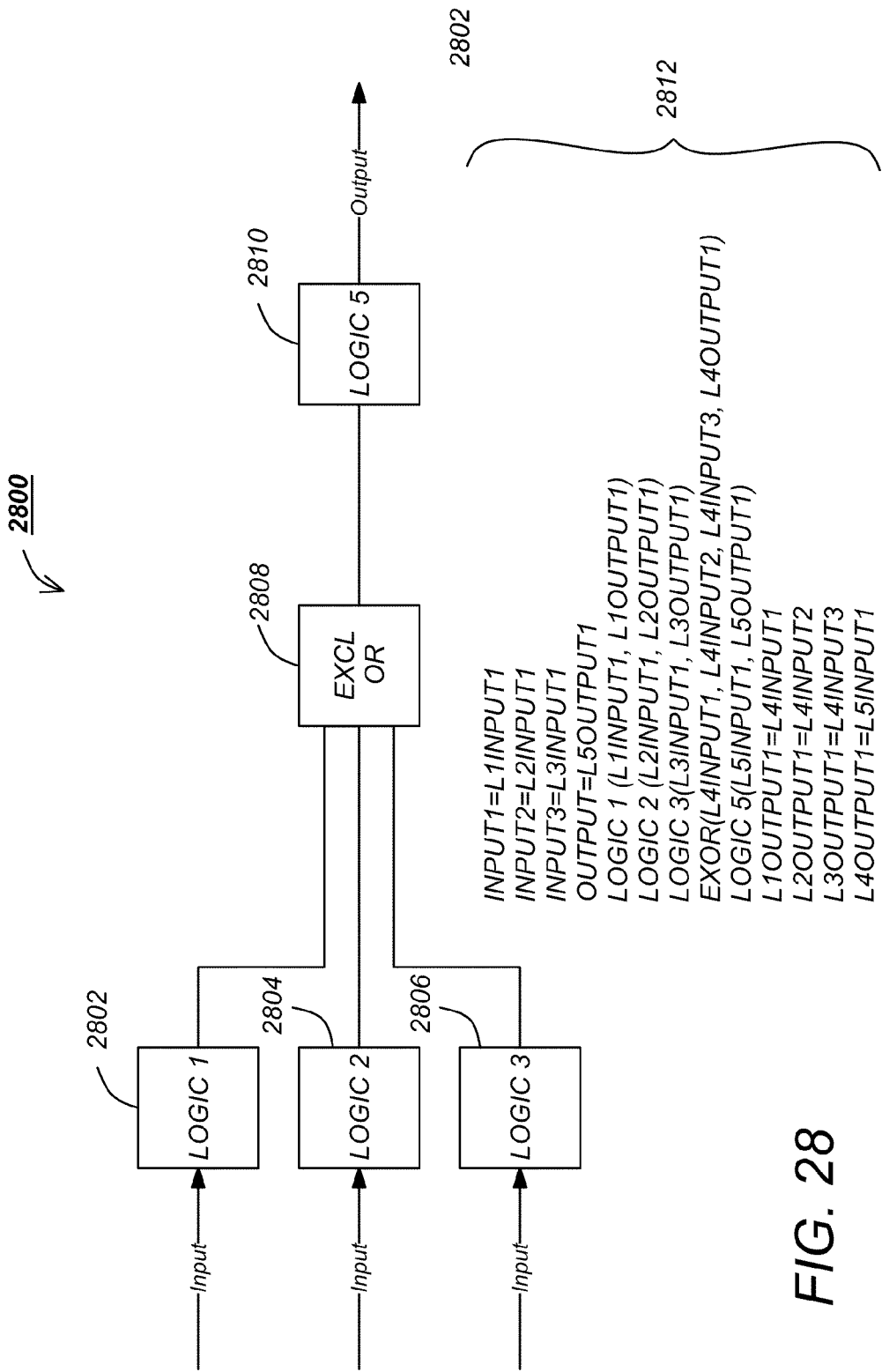
FIGS. 28 and 29 are diagrams further illustrating the camouflaging technique described in FIG. 26.
Figure 29:
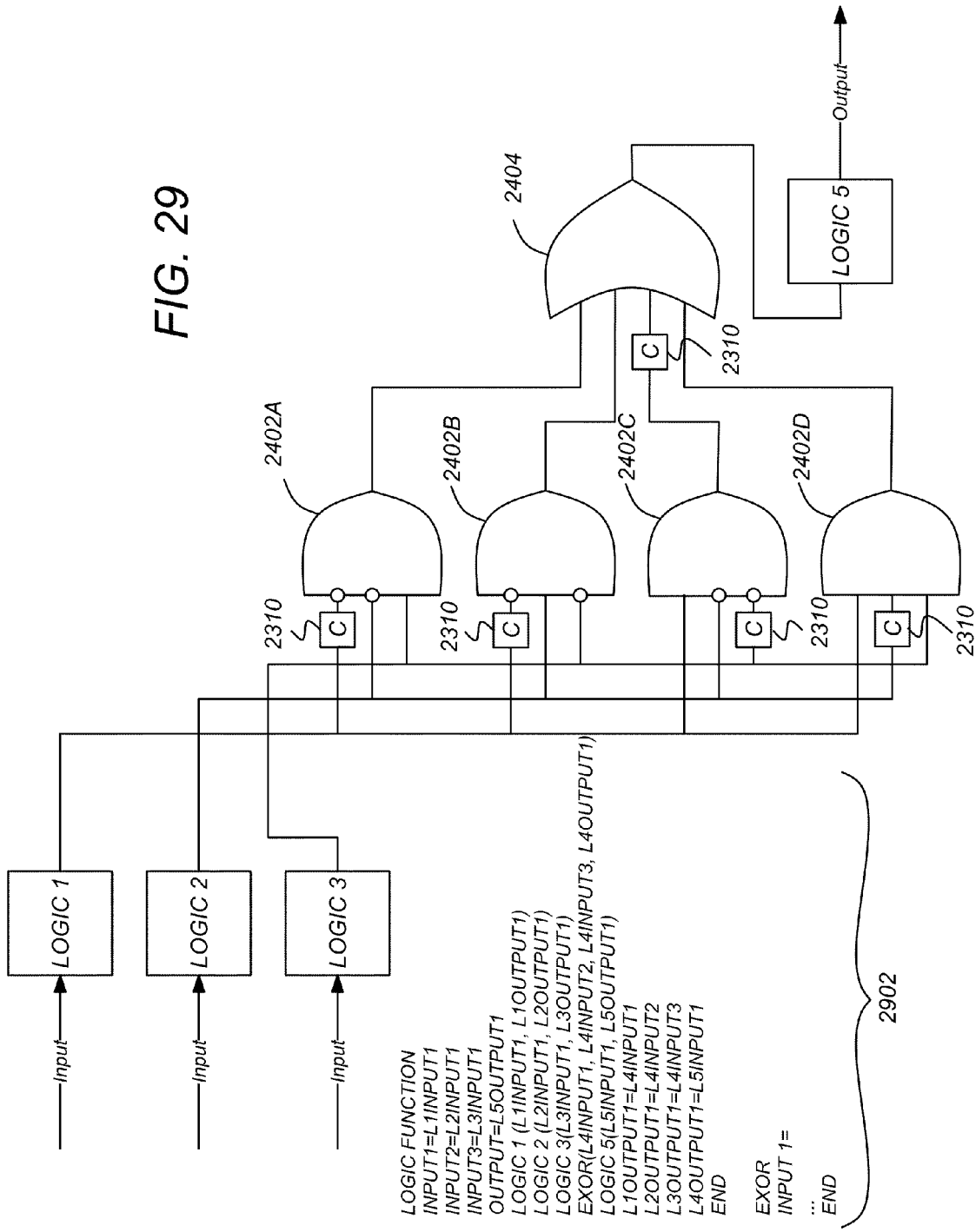

FIGS. 28 and 29 are diagrams further illustrating the foregoing technique. FIG. 28 is a diagram describing an interconnection of logical cells 2800, including cells 2802-2810. Logical cell 2808 provides an EXCLUSIVE OR function, which is one of many standard functions available in the cell library. An exemplary logical description or netlist 2812 of the interconnection of the logical cells 2800 is also shown.

FIG. 29 is a diagram illustrating an camouflaged interconnection of logic cells 2900. In this embodiment, the alternate implementation of the EXCLUSIVE OR function shown in FIG. 27 has been inserted for the EXCLUSIVE OR block 2808 shown in FIG. 28. This can be accomplished by defining a logical function EXOR(*) as a the combination of gates shown in FIG. 27 and including a call to the newly redefined EXOR circuit element shown in the logical description 2902. Alternatively, a second EXCLUSIVE OR function can be defined (e.g. EXOR2), and the second EXCLUSIVE OR function can be recited in the logical description.

Figure 30:
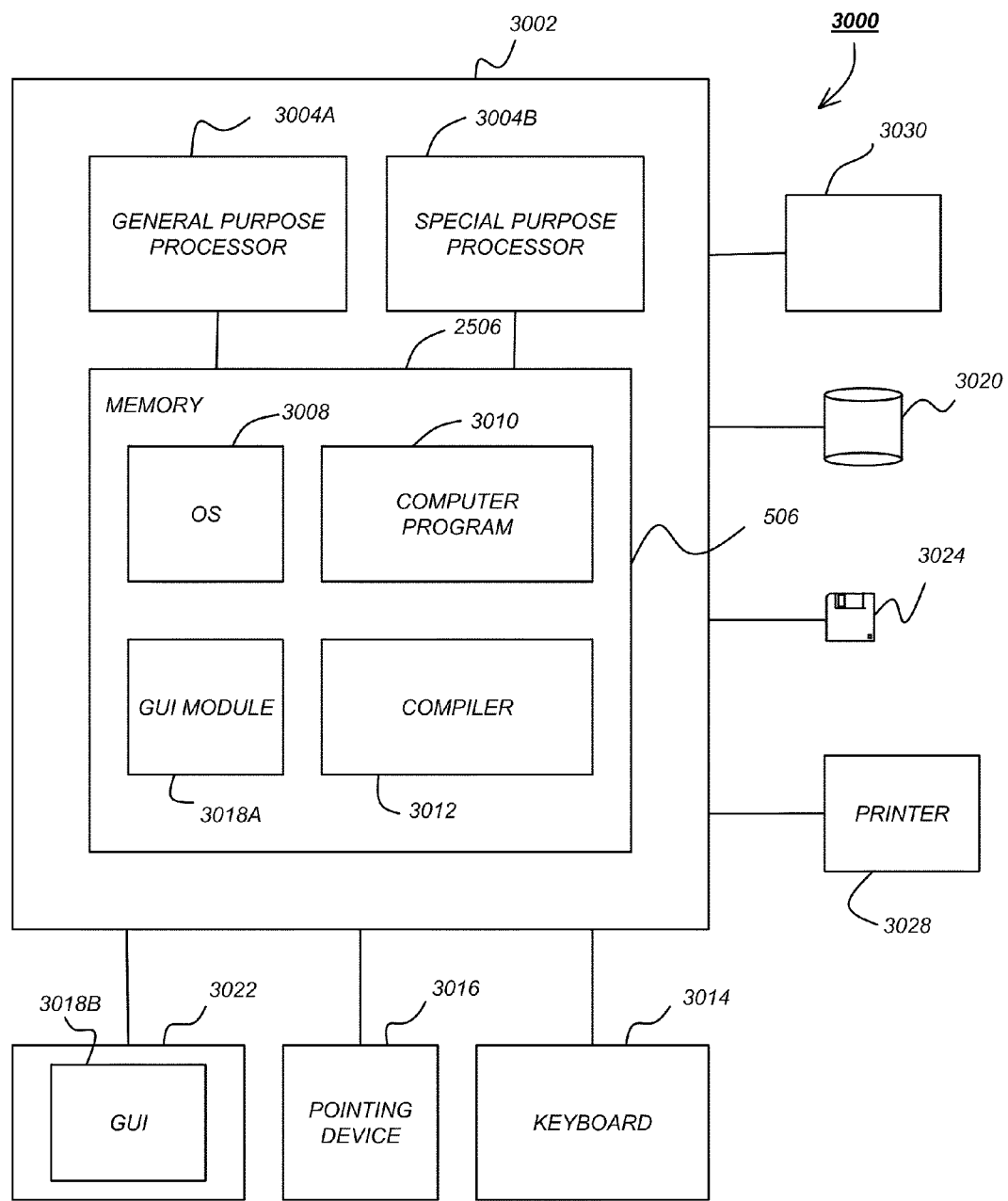
FIG. 30 illustrates an exemplary computer system that could be used to implement the camouflaging process.

FIG. 30 is a diagram illustrating an exemplary computer system 3000 that could be used to implement elements the present invention. The computer system 3000 comprises a computer 3002 that can include a general purpose hardware processor 3004A and/or a special purpose hardware processor 3004B (hereinafter alternatively collectively referred to as processor 3004) and a memory 3006, such as random access memory (RAM). The computer 3002 may be coupled to other devices, including input/output (I/O) devices such as a keyboard 3014, a mouse device 3016 and a printer 3028.

In one embodiment, the computer 3002 operates by the general purpose processor 3004A performing instructions defined by the computer program 3010 under control of an operating system 3008. The computer program 3010 and/or the operating system 3008 may be stored in the memory 3006 and may interface with the user and/or other devices to accept input and commands and, based on such input and commands and the instructions defined by the computer program 3010 and operating system 3008 to provide output and results.

Output/results may be presented on the display 3022 or provided to another device for presentation or further processing or action. In one embodiment, the display 3022 comprises a liquid crystal display (LCD) having a plurality of separately addressable pixels formed by liquid crystals. Each pixel of the display 3022 changes to an opaque or translucent state to form a part of the image on the display in response to the data or information generated by the processor 504 from the application of the instructions of the computer program 3010 and/or operating system 508 to the input and commands. Other display 3022 types also include picture elements that change state in order to create the image presented on the display 3022. The image may be provided through a graphical user interface (GUI) module 3018A. Although the GUI module 3018A is depicted as a separate module, the instructions performing the GUI functions can be resident or distributed in the operating system 3008, the computer program 3010, or implemented with special purpose memory and processors.

Some or all of the operations performed by the computer 3002 according to the computer program 3010 instructions may be implemented in a special purpose processor 3004B. In this embodiment, some or all of the computer program 3010 instructions may be implemented via firmware instructions stored in a read only memory (ROM), a programmable read only memory (PROM) or flash memory within the special purpose processor 3004B or in memory 3006. The special purpose processor 3004B may also be hardwired through circuit design to perform some or all of the operations to implement the present invention. Further, the special purpose processor 3004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 3002 may also implement a compiler 3012 which allows an application program 3010 written in a programming language such as COBOL, C++, FORTRAN, or other language to be translated into processor 3004 readable code. After completion, the application or computer program 3010 accesses and manipulates data accepted from I/O devices and stored in the memory 3006 of the computer 3002 using the relationships and logic that was generated using the compiler 3012.

The computer 3002 also optionally comprises an external communication device such as a modem, satellite link, Ethernet card, or other device for accepting input from and providing output to other computers.

In one embodiment, instructions implementing the operating system 3008, the computer program 3010, and/or the compiler 3012 are tangibly embodied in a computer-readable medium, e.g., data storage device 3020, which could include one or more fixed or removable data storage devices, such as a zip drive, floppy disc drive 3024, hard drive, CD-ROM drive, tape drive, or a flash drive. Further, the operating system 3008 and the computer program 3010 are comprised of computer program instructions which, when accessed, read and executed by the computer 3002, causes the computer 3002 to perform the steps necessary to implement and/or use the present invention or to load the program of instructions into a memory, thus creating a special purpose data structure causing the computer to operate as a specially programmed computer executing the method steps described herein. Computer program 3010 and/or operating instructions may also be tangibly embodied in memory 3006 and/or data communications devices 3030, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 3002.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. In summary, the present invention describes a method and apparatus for camouflaging an circuit and a circuit formed by the camouflaging process.

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method of camouflaging an application specific integrated circuit (ASIC) wherein the ASIC comprises interconnected functional logic performing a logical function, the method comprising the steps of:

generating, using the computer, a logical description of the interconnected functional logic for performing a logical function, the logical description comprising a plurality of interconnected logic cells, each logic cell including an input and an output, generating, using the computer, a logical description of a functionally inert camouflage element including at least one filler cell;

generating, using the computer, a camouflaged logical description of the interconnected functional logic by incorporating the generated logical description of the functionally inert camouflage element into the generated logical description of the interconnected functional logic without affecting the logical function wherein the functionally inert camouflage element comprises the at least one filler cell communicatively coupled to a logical input or logical output of at least one of the interconnected logic cells; and generating, using the computer, a camouflaged ASIC design from the camouflaged logical description.

2. The method of claim 1, wherein:
the interconnected logic cells include a first logic cell having a first logic cell output and a second logic cell having a second logic cell input, and the first logic cell output is communicatively coupled to the second logic cell input;
the step of generating, using the computer, a camouflaged logical description of the interconnected functional logic by incorporating the generated logical description of the functionally inert camouflage element into the generated logical description of the interconnected functional logic without affecting the logical function comprises the step of:
defining, using the computer, the logical description of the interconnected functional logic to include the at least one filler cell communicatively coupled to the first logic cell output and the second logic cell input.

3. The method of claim 1, wherein:
the functionally inert camouflage element comprises a plurality of filler cell inputs; and
the step of generating, using the computer, a camouflaged logical description of the interconnected functional logic by incorporating the generated logical description of the functionally inert camouflage element into the generated logical description of the interconnected functional logic without affecting the logical function comprises the step of:
defining, using the computer, the logical description of the interconnected functional logic to include each of the plurality of filler cell inputs communicatively coupled to an associated logic cell output.

4. The method of claim 3, wherein:
the functionally inert camouflage element comprises a plurality of filler cell outputs; and
the step of generating, using the computer, a camouflaged logical description of the interconnected functional logic by incorporating the generated logical description of the functionally inert camouflage element into the generated logical description of the interconnected functional logic without affecting the logical function further comprises the step of:
defining, using the computer, the logical description of the interconnected functional logic to include each of the plurality of filler cell outputs communicatively coupled to an associated logic cell input.

5. The method of claim 1, wherein:
the functionally inert camouflage element comprises a plurality of filler cell outputs; and
the step of generating, using the computer, a camouflaged logical description of the interconnected functional logic by incorporating the generated logical description of the functionally inert camouflage element into the generated logical description of the interconnected functional logic without affecting the logical function further comprises the step of:
defining, using the computer, the logical description of the interconnected functional logic to include each of the plurality of filler cell outputs communicatively coupled to an associated logic cell input.

6. The method of claim 1, wherein:
the functionally inert camouflage element comprises a filler cell input and a filler cell output; and
the step of generating, using the computer, a camouflaged logical description of the interconnected functional logic by incorporating the generated logical description of the functionally inert camouflage element into the generated logical description of the interconnected functional logic without affecting the logical function further comprises the step of:
defining, using the computer, the logical description of the interconnected functional logic to include the filler cell input communicatively coupled to a logic cell output and the filler cell output communicatively coupled to a logic cell input.

7. The method of claim 1, wherein:
the functionally inert camouflage element comprises a camouflage element output and a camouflage element input; and
the step of generating, using the computer, a camouflaged logical description of the interconnected functional logic by incorporating the generated logical description of the functionally inert camouflage element into the generated logical description of the interconnected functional logic without affecting the logical function further comprises the step of:
defining, using the computer, the logical description of the interconnected functional logic to include the camouflage element input communicatively coupled to an output of a first logic cell and the camouflage element output communicatively coupled to an input of a second logic cell.

8. The method of claim 7, wherein the functionally inert camouflage element comprises a logic function such that the camouflage element output always has the same logical state as the output of the first logic cell.

9. The method of claim 8, wherein the functionally inert camouflage element filler cell comprises:
a gate, having a first gate input, a second gate input, and a gate output;
wherein:
the first gate input is communicatively coupled to the first logic cell output;
the second gate input is communicatively coupled to one or more filler cells having a constant logical value output; and
the gate output is communicatively coupled to the second logic cell input.

10. A camouflaged application specific integrated circuit (ASIC) comprising:
interconnected functional logic performing a logical function for performing a logical function, comprising a plurality of interconnected logic cells, each logic cell including an input and an output, and
a functionally inert camouflage element incorporated into the interconnected functional logic, the functionally inert camouflage element including at least one filler cell communicatively coupled to a logical input or logical output of at least one of the interconnected logic cells without affecting the logical function performed by the interconnected functional logic.

11. The ASIC of claim 10, wherein:
the interconnected logic cells include a first logic cell having a first logic cell output and a second logic cell having a second logic cell input, and the first logic cell output is communicatively coupled to the second logic cell input; and the at least one filler cell communicatively coupled to the first logic cell output and the second logic cell input.

12. The ASIC of claim 10, wherein:
the functionally inert camouflage element comprises a plurality of filler cell inputs; and
the interconnected functional logic includes each of the plurality of filler cell inputs communicatively coupled to an associated logic cell output.

13. The ASIC of claim 12, wherein:
the functionally inert camouflage element comprises a plurality of filler cell outputs; and
the interconnected functional logic includes each of the plurality of filler cell outputs communicatively coupled to an associated logic cell input.

14. The ASIC of claim 10, wherein:
the functionally inert camouflage element comprises a plurality of filler cell outputs; and
the interconnected functional logic includes each of the plurality of filler cell outputs communicatively coupled to an associated logic cell input.

15. The ASIC of claim 10, wherein:
the functionally inert camouflage element comprises a filler cell input and a filler cell output; and
the interconnected functional logic includes the filler cell input communicatively coupled to a logic cell output and the filler cell output communicatively coupled to a logic cell input.

16. The ASIC of claim 10, wherein:
the functionally inert camouflage element comprises a camouflage element output and a camouflage element input; and
the interconnected functional logic includes the camouflage element input communicatively coupled to an output of a first logic cell and the camouflage element output communicatively coupled to an input of a second logic cell.

17. The ASIC of claim 16, wherein the functionally inert camouflage element comprises a logic function such that the logic cell output always has the same logical state as the output of the first logic cell.

18. The ASIC of claim 17, wherein the functionally inert camouflage element filler cell comprises:

a gate, having a first gate input, a second gate input, and a gate output; and wherein:

the first gate input is communicatively coupled to the first logic cell output;

the second gate input is communicatively coupled to one or more further filler cells having constant logical values; and the gate output is communicatively coupled to the second logic cell input.

* * * * *